United States Patent
Park

(10) Patent No.: US 7,542,389 B2
(45) Date of Patent: Jun. 2, 2009

(54) WRITE-ONCE OPTICAL DISC, METHOD AND APPARATUS FOR RECORDING MANAGEMENT INFORMATION ON WRITE-ONCE OPTICAL DISC

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/060,735

(22) Filed: Apr. 1, 2008

(65) Prior Publication Data

US 2008/0186814 A1  Aug. 7, 2008

Related U.S. Application Data

(63) Continuation of application No. 10/887,905, filed on Jul. 12, 2004, now Pat. No. 7,372,792.

(30) Foreign Application Priority Data

Jul. 14, 2003  (KR) ............... 10-2003-47989
Sep. 6, 2003   (KR) ............... 10-2003-62379

(51) Int. Cl.
*G11B 5/09* (2006.01)
(52) U.S. Cl. ............... 369/47.22; 369/275.2; 369/53.31
(58) Field of Classification Search ......... 369/47.22, 369/47.23, 47.14, 53.24, 47.27, 53.31, 59.25, 369/275.1–275.5; 386/95, 125, 126
See application file for complete search history.

(56) References Cited

U.S. PATENT DOCUMENTS

| | | |
|---|---|---|
| 4,558,446 A | 12/1985 | Banba et al. |
| 4,733,386 A | 3/1988 | Shimoi et al. |
| 4,807,205 A | 2/1989 | Picard et al. |
| 4,963,866 A | 10/1990 | Duncan |
| 5,068,842 A | 11/1991 | Naito et al. |
| 5,111,444 A | 5/1992 | Fukushima et al. |
| 5,210,734 A | 5/1993 | Sakurai et al. |
| 5,235,585 A | 8/1993 | Bish et al. |
| 5,237,553 A | 8/1993 | Fukushima et al. |
| 5,247,494 A | 9/1993 | Ohno et al. |
| 5,319,626 A | 6/1994 | Ozaki et al. |
| 5,404,357 A | 4/1995 | Ito et al. |

(Continued)

FOREIGN PATENT DOCUMENTS

CN  1134017 A  10/1996

(Continued)

OTHER PUBLICATIONS

JIS handbook data processing for hardware, Japan, Japanese Standards Association Inc., Apr. 21, 1999, pp. 1064-1070.

*Primary Examiner*—Ali Neyzari
(74) *Attorney, Agent, or Firm*—Birch, Stewart, Kolasch & Birch, LLP

(57) ABSTRACT

A recording medium, and a method and apparatus for recording management information on the recording medium, are provided. According to an embodiment, there is provided a method for recording management information on a recording medium, the method comprising: determining whether recording of padding data in a recordable area of a recordable recording-range of the recording medium is performed, when the recordable recording-range is changed to be a non-recordable recording range; and recording padding indicator information indicating whether the recording of padding data is performed.

22 Claims, 28 Drawing Sheets

U.S. PATENT DOCUMENTS

| | | |
|---|---|---|
| 5,442,611 A | 8/1995 | Hosaka et al. |
| 5,448,728 A | 9/1995 | Takano et al. |
| 5,475,820 A | 12/1995 | Natrasevschi et al. |
| 5,481,519 A | 1/1996 | Hosoya et al. |
| 5,495,466 A | 2/1996 | Dohmeier et al. |
| 5,528,571 A | 6/1996 | Funahashi et al. |
| 5,553,045 A | 9/1996 | Obata et al. |
| 5,555,537 A | 9/1996 | Imaino et al. |
| 5,577,194 A | 11/1996 | Wells et al. |
| 5,608,715 A | 3/1997 | Yokogawa et al. |
| 5,715,221 A | 2/1998 | Ito et al. |
| 5,720,030 A | 2/1998 | Kamihara et al. |
| 5,732,053 A | 3/1998 | Yano et al. |
| 5,740,435 A | 4/1998 | Yamamoto et al. |
| 5,745,444 A | 4/1998 | Ichikawa et al. |
| 5,799,212 A | 8/1998 | Ohmori et al. |
| 5,802,028 A | 9/1998 | Igarashi et al. |
| 5,805,536 A | 9/1998 | Gage et al. |
| 5,825,726 A | 10/1998 | Hwang et al. |
| 5,848,038 A | 12/1998 | Igarashi et al. |
| 5,867,455 A | 2/1999 | Miyamoto et al. |
| 5,878,020 A | 3/1999 | Takahashi |
| 5,914,928 A | 6/1999 | Takahashi et al. |
| 5,940,702 A | 8/1999 | Sakao et al. |
| 6,058,085 A | 5/2000 | Obata et al. |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma et al. |
| 6,341,278 B1 | 1/2002 | Yamamoto et al. |
| 6,373,800 B1 | 4/2002 | Takahashi et al. |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko et al. |
| 6,469,978 B1 | 10/2002 | Ohata et al. |
| 6,477,126 B1 | 11/2002 | Park et al. |
| 6,480,446 B1 | 11/2002 | Ko et al. |
| 6,493,301 B1 | 12/2002 | Park et al. |
| 6,496,807 B1 | 12/2002 | Inokuchi et al. |
| 6,529,458 B1 | 3/2003 | Shin et al. |
| 6,542,450 B1 | 4/2003 | Park et al. |
| 6,564,345 B1 | 5/2003 | Kim et al. |
| 6,581,167 B1 | 6/2003 | Gotoh et al. |
| 6,606,285 B1 | 8/2003 | Ijtsma et al. |
| 6,615,363 B1 | 9/2003 | Fukasawa et al. |
| 6,631,106 B1 | 10/2003 | Numata et al. |
| 6,633,724 B1 | 10/2003 | Hasegawa et al. |
| 6,667,939 B1 | 12/2003 | Miyamoto et al. |
| 6,671,249 B2 | 12/2003 | Horie et al. |
| 6,697,306 B2 | 2/2004 | Sako et al. |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama et al. |
| 6,766,418 B1 | 7/2004 | Alexander et al. |
| 6,785,206 B1 | 8/2004 | Lee et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki et al. |
| 6,934,236 B2 | 8/2005 | Lee et al. |
| 6,999,398 B2 | 2/2006 | Yamamoto et al. |
| 7,002,882 B2 | 2/2006 | Takahashi et al. |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,349,301 B2 | 3/2008 | Terada et al. |
| 7,379,402 B2 | 5/2008 | Ko et al. |
| 2001/0009537 A1 | 7/2001 | Park |
| 2001/0011267 A1 | 8/2001 | Kihara et al. |
| 2001/0021144 A1 | 9/2001 | Oshima et al. |
| 2001/0026511 A1 | 10/2001 | Ueda et al. |
| 2001/0043525 A1 | 11/2001 | Ito et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0137913 A1 | 7/2003 | Oshima et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 | 4/2004 | Hwang et al. |
| 2004/0090888 A1 | 5/2004 | Park et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0160799 A1 | 8/2004 | Park et al. |
| 2004/0165495 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0193946 A1 | 9/2004 | Park et al. |
| 2004/0223427 A1 | 11/2004 | Kim et al. |
| 2004/0246851 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |

| | | | | | | |
|---|---|---|---|---|---|---|
| 2005/0047294 A1 | 3/2005 | Park | | JP | 10-187358 | 7/1998 |
| 2005/0050402 A1 | 3/2005 | Koda et al. | | JP | 10-187359 | 7/1998 |
| 2005/0052972 A1 | 3/2005 | Park | | JP | 10-187360 | 7/1998 |
| 2005/0052973 A1 | 3/2005 | Park | | JP | 10-187361 A1 | 7/1998 |
| 2005/0055500 A1 | 3/2005 | Park | | JP | 11-110888 A | 4/1999 |
| 2005/0060489 A1 | 3/2005 | Park | | JP | 11-203792 A | 7/1999 |
| 2005/0068877 A1 | 3/2005 | Yeo | | JP | 2000-090588 A | 3/2000 |
| 2005/0083740 A1 | 4/2005 | Kobayashi | | JP | 2000-149449 A | 5/2000 |
| 2005/0083767 A1 | 4/2005 | Terada et al. | | JP | 2000-195178 A | 7/2000 |
| 2005/0083830 A1 | 4/2005 | Martens et al. | | JP | 2000-215612 | 8/2000 |
| 2005/0195716 A1 | 9/2005 | Ko et al. | | JP | 2000-285607 A | 10/2000 |
| 2005/0207262 A1 | 9/2005 | Terada et al. | | JP | 2001-023317 A | 1/2001 |
| 2005/0289389 A1 | 12/2005 | Yamagami et al. | | JP | 2001-069440 A | 3/2001 |
| 2006/0077827 A1 | 4/2006 | Takahashi | | JP | 2001-110168 A | 4/2001 |
| 2006/0195719 A1 | 8/2006 | Ueda et al. | | JP | 2001-148166 A | 5/2001 |
| 2006/0203635 A1 | 9/2006 | Ko et al. | | JP | 2001 319339 A | 11/2001 |
| 2006/0203638 A1 | 9/2006 | Ko et al. | | JP | 2001-351334 A | 12/2001 |
| 2006/0203684 A1 | 9/2006 | Ko et al. | | JP | 2001-357623 A | 12/2001 |
| 2006/0227694 A1 | 10/2006 | Woerlee et al. | | JP | 2002-015507 A | 1/2002 |
| 2007/0294571 A1 | 12/2007 | Park et al. | | JP | 2002-015525 A | 1/2002 |
| 2008/0046780 A1 | 2/2008 | Shibuya et al. | | JP | 2002-056619 A | 2/2002 |
| | | | | JP | 2002 170342 A | 6/2002 |
| FOREIGN PATENT DOCUMENTS | | | | JP | 2002-215612 A | 8/2002 |
| | | | | JP | 2002-245723 A | 8/2002 |
| CN | 1140897 C | 1/1997 | | JP | 2002-288938 A | 10/2002 |
| CN | 1227950 A | 9/1999 | | JP | 2002-329321 A | 11/2002 |
| CN | 1273419 A | 11/2000 | | JP | 2002-352522 A | 12/2002 |
| CN | 1675708 A | 9/2005 | | JP | 2003 228962 A | 8/2003 |
| CN | 1685426 A | 10/2005 | | JP | 2003-335062 | 11/2003 |
| DE | 199 54 054 A1 | 6/2000 | | JP | 2003-536194 A | 12/2003 |
| EP | 0314186 A2 | 5/1989 | | JP | 2004 095057 A | 3/2004 |
| EP | 0325823 A1 | 8/1989 | | JP | 2004 213774 A | 7/2004 |
| EP | 0350920 A2 | 1/1990 | | JP | 2004-280864 A | 10/2004 |
| EP | 0464811 A2 | 1/1992 | | JP | 2004-280865 A | 10/2004 |
| EP | 0472484 A2 | 2/1992 | | JP | 2005-004912 A | 6/2005 |
| EP | 0477503 A2 | 4/1992 | | JP | 2005-535993 A | 11/2005 |
| EP | 0556046 A1 | 8/1993 | | JP | 2005-538490 A | 12/2005 |
| EP | 0871172 A2 | 10/1998 | | JP | 2005-538491 A | 12/2005 |
| EP | 0908882 A2 | 4/1999 | | JP | 2006-519445 A | 8/2006 |
| EP | 0 971 345 A1 | 1/2000 | | KR | 1020040094301 A | 11/2004 |
| EP | 0974967 A1 | 1/2000 | | RU | 2005 103 626 | 9/2005 |
| EP | 0989554 A1 | 3/2000 | | RU | 2005 127 337 | 2/2006 |
| EP | 0997904 A1 | 5/2000 | | TW | 302475 A | 3/1985 |
| EP | 1026681 B1 | 8/2000 | | TW | 283232 A | 8/1996 |
| EP | 1 040 937 A1 | 10/2000 | | TW | 371752 | 10/1999 |
| EP | 1043723 A1 | 10/2000 | | TW | 413805 | 12/2000 |
| EP | 1132914 A2 | 9/2001 | | TW | 495750 B | 7/2002 |
| EP | 1148493 A2 | 10/2001 | | WO | WO-84/00628 A1 | 2/1984 |
| EP | 1152414 A2 | 11/2001 | | WO | WO-96/30902 A1 | 10/1996 |
| EP | 1239478 A1 | 9/2002 | | WO | WO-97/22182 A1 | 6/1997 |
| EP | 1274081 A2 | 1/2003 | | WO | WO-00/54274 A1 | 9/2000 |
| EP | 1298659 A1 | 4/2003 | | WO | WO-01/22416 A1 | 3/2001 |
| EP | 1 321 940 A1 | 6/2003 | | WO | WO-01/93035 A2 | 12/2001 |
| EP | 1329888 A1 | 7/2003 | | WO | WO-03/007296 A1 | 1/2003 |
| EP | 1347452 A2 | 9/2003 | | WO | WO-03/025924 A1 | 3/2003 |
| EP | 1547065 A0 | 6/2005 | | WO | WO-03/079353 A1 | 9/2003 |
| EP | 1564740 A1 | 8/2005 | | WO | WO-2004/015707 A1 | 2/2004 |
| EP | 1573723 A0 | 9/2005 | | WO | WO-2004/015708 A1 | 2/2004 |
| EP | 1612790 A1 | 1/2006 | | WO | WO-2004/015780 A1 | 2/2004 |
| EP | 1623422 A0 | 2/2006 | | WO | WO-2004/025648 A1 | 3/2004 |
| GB | 2356735 A | 5/2001 | | WO | WO-2004/025649 A1 | 3/2004 |
| JP | 63-091842 A | 4/1988 | | WO | WO-2004/029668 A2 | 4/2004 |
| JP | 01-263955 A | 10/1989 | | WO | WO-2004/029941 A1 | 4/2004 |
| JP | 02-023417 A | 1/1990 | | WO | WO-2004/034396 A1 | 4/2004 |
| JP | 05-274814 A | 10/1993 | | WO | WO-2004/036561 A1 | 4/2004 |
| JP | 06-349201 A | 12/1994 | | WO | WO-2004/053872 A1 | 6/2004 |
| JP | 08-096522 A | 4/1996 | | WO | WO-2004/053874 A1 | 6/2004 |
| JP | 09-145634 A | 6/1997 | | WO | WO-2004/068476 A1 | 8/2004 |
| JP | 09-231053 A | 9/1997 | | WO | WO-2004/015180 A1 | 9/2004 |
| JP | 10-050005 A | 2/1998 | | WO | WO-2004/079631 | 9/2004 |
| JP | 10-050032 A | 2/1998 | | WO | WO-2004/079731 A1 | 9/2004 |
| JP | 10-187356 | 7/1998 | | WO | WO-2004/079740 A1 | 9/2004 |
| JP | 10-187357 | 7/1998 | | | | |

| | | | | | | |
|---|---|---|---|---|---|---|
| WO | WO-2004/081926 A1 | 9/2004 | | WO | WO-2004/100156 A1 | 11/2004 |
| WO | WO-2004/093035 A1 | 10/2004 | | WO | WO-2005/004123 A1 | 1/2005 |
| WO | WO-2004/100155 A1 | 11/2004 | | WO | WO-2005/004154 A2 | 1/2005 |

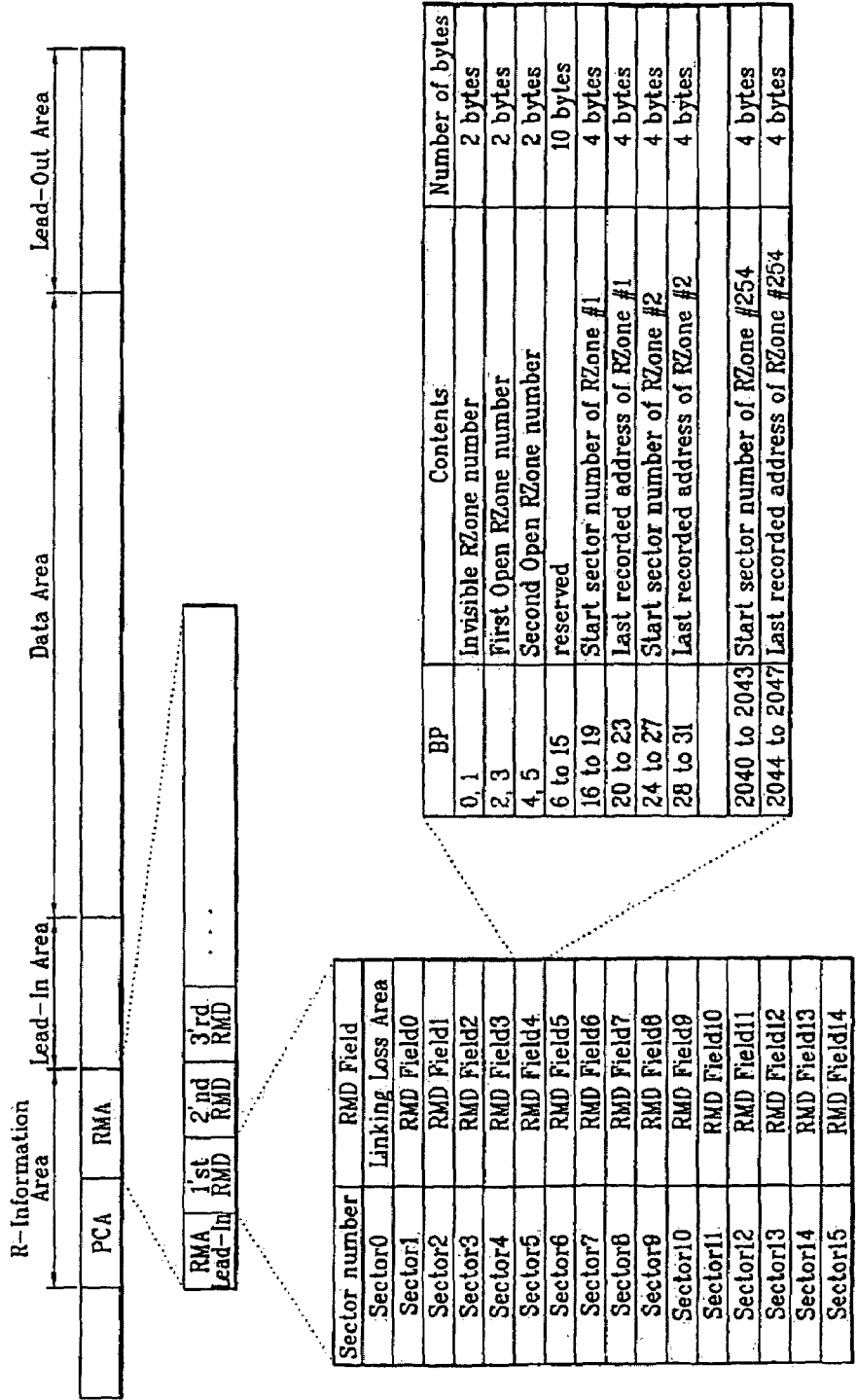

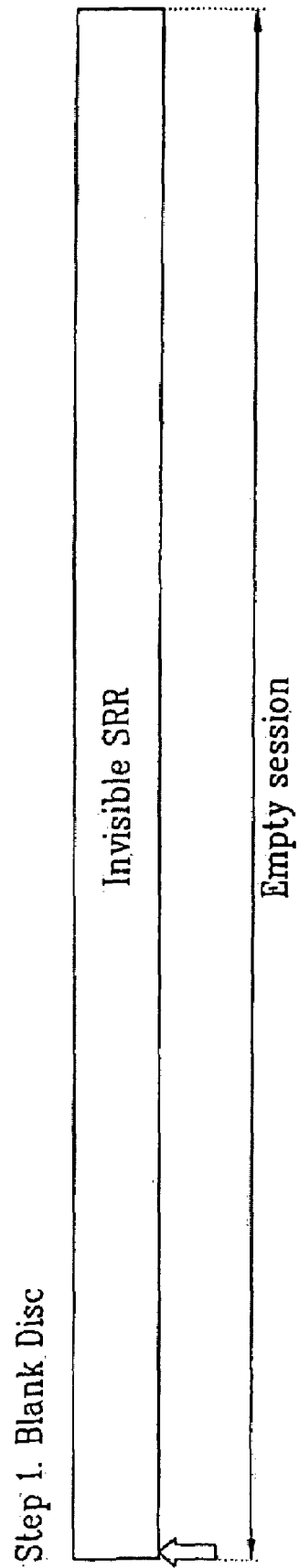

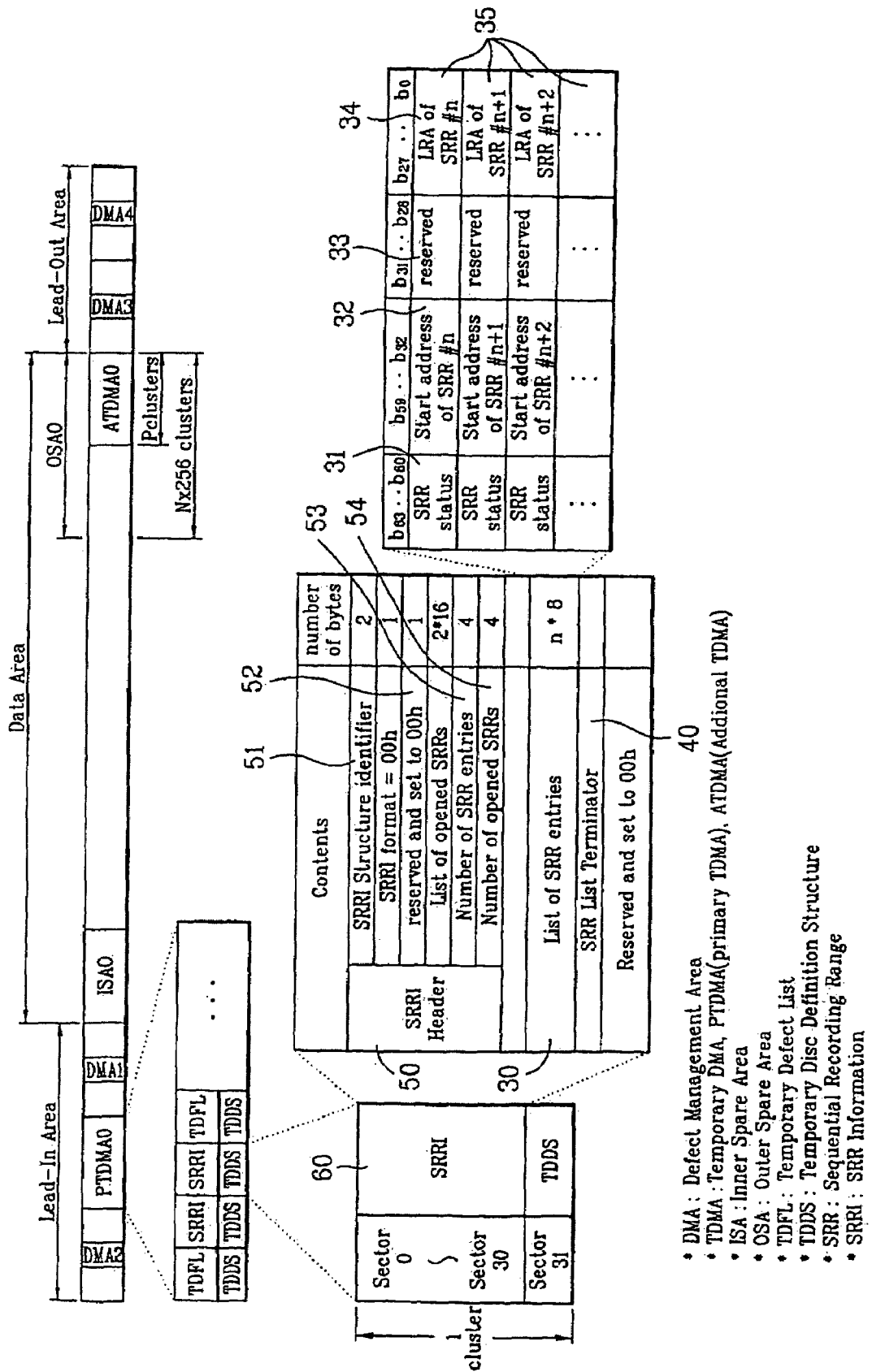

0000b : opened, invisible SRR
0001b : opened, incomplete SRR
0010b : opened, empty SRR
0011b : opened, partially Recorded SRR 0100b : closed, empty SRR
0101b : closed, Partially Recorded SRR
0110b : closed, complete SRR with padded data
0111b : closed, complete SRR without padded data 0000b : opened SRR
0010b : closed, empty or Partially recorded SRR
0100b : closed, complete SRR (include in case of padding data)

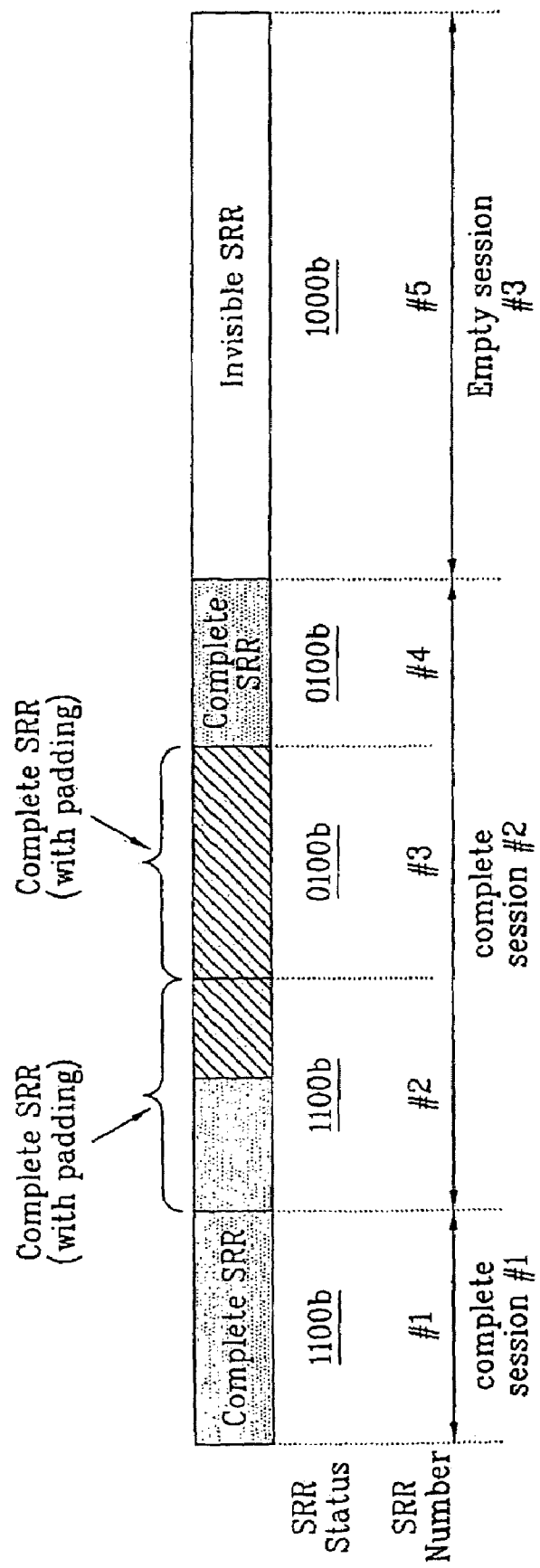

WRITE-ONCE OPTICAL DISC, METHOD AND APPARATUS FOR RECORDING MANAGEMENT INFORMATION ON WRITE-ONCE OPTICAL DISC

This application is a continuation of application Ser. No. 10/887,905, filed Jul. 12, 2004 now U.S. Pat. No. 7,372,792 (now allowed), and for which priority is claimed under 35 U.S.C. § 120; and this application claims priority of the Korean Patent Application No. 10-2003-0047989 filed on Jul. 14, 2003 and No. 10-2003-0062379 filed on Sep. 6, 2003 under 35 U.S.C. § 119; the entire contents of each of these applications are hereby incorporated by reference.

BACKGROUND OF THE INVENTION

1. Field of the Invention

The present invention relates to a recording medium such as a write-once optical disc and a method and apparatus for recording management information on the write-once optical disc.

2. Discussion of the Related Art

As an optical recording medium, optical discs on which high-capacity data can be recorded are widely being used. Among them, a new high-density optical recording medium (HD-DVD), for example, a Blu-ray disc, has been recently developed for recording and storing high-definition video data and high-quality audio data for a long term period.

The Blu-ray disc is the next generation HD-DVD technology and the next generation optical recording solution, and has an excellent capability to store data more than the existing DVDs. Recently, a technical specification of international standard for HD-DVD has been established.

Related with this, various standards for a write-once Blu-ray disc (BD-WO) are being prepared following the standards for a rewritable Blu-ray disc (BD-RE).

Among the standards for the write-once Blu-ray disc (BD-WO), a disc management information recording method is particularly discussed. This method includes a method of recording information on the recording status of the disc as a characteristic of the write-once optical disc. The information on the recording status of a disc is referred to herein as recording status information or disc recording status information.

The recording status information represents a usage status of the disc, and allows a host or user to find easily a recordable area on the write-once optical disc. For the conventional write-once optical discs such as CDs and DVDs, the information on the disc recording status is known as: track information for the CD, and RZone or fragment for the DVD.

FIG. 1 is a schematic diagram illustrating the recording status information of a DVD-R disc according to a related art.

Referring to FIG. 1, the management information of the DVD-R is recorded in a recording management data (RMD) area. Particularly, the recording status information of the DVD-R is managed using RMD fields 4-12 of the RMD area. There are an open RZone, an invisible R-Zone and a closed RZone.

As for the RZone information, when a host requires an additionally recordable location to additionally record data on the disc, a driver confirms the LRAs (last recorded areas) of a first open RZone and a second open RZone, and generally transmits the location "LRA+1" as the additionally recordable location to the host.

However, since the conventional DVD-R as described above is different from a write-once Blu-ray disc (BD-WO) in their physical structure and environment, the conventional method of providing management information cannot be just applied to the BD-WO. In case of the BD-WO, a driver manages disc defects, but the BD-WO is required to have a special additional area for the driver to manage the defects. The BD-WO, thus, has a complex disc structure and as a result, the method of managing the recording status of the DVD-R cannot be used for the BD-WO.

Accordingly, there is a need for a method of managing the recording status of a high density write-once optical disc such as a BD-WO, so that the disc can be accessed easily and used more effectively. And such management information should be structured to ensure compatibility with the overall structure use and standards of the BD-WO.

SUMMARY OF THE INVENTION

Accordingly, the present invention is directed to a recording medium, and a method and apparatus for recording management information on the recording medium, which substantially obviate one or more problems due to limitations and disadvantages of the related art.

An object of the present invention is to provide a write-once optical disc such as a BD-WO with recording status information provided thereon, and a method and apparatus for efficiently recording and managing this recording status information.

Another object of the present invention is to provide a technique of defining new sequential recording range (SRR) types for a write-once optical disc and recording the new SRR types in SRR information (SRRI).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a recording medium comprising at least one recording layer; and at least one, SRR entry, each SRR entry corresponding to an SRR and including at least one status field for indicating a recording status of the corresponding SRR, the at least one status field including a session start flag for indicating whether the corresponding SRR is a start of a session, the session being formed by a group of the SRRs, each SRR entry further including a start address field indicating, where the corresponding SRR starts, and a last address field indicating the last recorded address of the corresponding SRR.

In another aspect of the present invention, there is provided a method for recording management information on a recording medium having at least one recording layer, the method comprising: recording at least one SRR entry on the at least one recording layer, each SRR entry corresponding to an SRR and including at least one status field for indicating a recording status of the corresponding SRR, the at least one status field including a session start flag for indicating whether the corresponding SRR is a start of a session, the session being formed by a group of the SRRs, each SRR entry further including a start address field indicating where the corresponding SRR starts, and a last address field indicating the last recorded address of the corresponding SRR.

In another aspect of the present invention, there is provided an apparatus for recording management information on a recording medium having, at least one recording layer, the apparatus comprising: a recording/reproducing unit to record at least one SRR entry on the at least one recording layer, each SRR entry corresponding to an SRR and including at least one status field for indicating a recording status of the corresponding SRR, the at least one status field including a session start flag for indicating whether the corresponding SRR is a start of a session, the session being formed by a group of the SRRs, each SRR entry further including a start address field indicating where the corresponding SRR starts, and a last address field indicating the last recorded address of the corresponding SRR. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a schematic diagram illustrating management information recorded on a DVD-R disc according to the related art;

FIGS. 4A to 4G illustrate an example of a process of recording SRR(s) and session(s) of a write-once optical disc according to the present invention;

FIG. 5 illustrates a structure of a write-once optical disc and a method for recording disc management information on the write-once optical disc according to the present invention;

FIGS. 13A and 13B illustrate an application of the SRR entry structure of FIG. 12 to the cases of FIGS. 4F and 4G, respectively;

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers are used throughout the drawings to refer to the same or like parts. For the convenience of description, a write-once Blu-ray disc (BD-WO) will be described as an example of a recording medium.

In this specification, the terminology of the present invention employs generally popularized terms if possible. However, in a specific case, terms are arbitrarily selected by the inventors. In this case, since the meanings of the terms are defined in detail in the corresponding descriptions, it is understood that the invention should be understood with the defined meanings of the terms, if defined in the specification.

According to the present invention, a plurality of areas are formed or reserved in a recording medium such as a write-once optical disc so that these areas can be recorded with detailed information. Each of these special recording areas is called a sequential recording range (SRR). Information on the recording status (recording status information or disc recording status information) of a write-once optical disc such as a BD-WO is called an SRR information (SRRI), similar to the use of the term "sequence recording" in the sequence recording mode of a BD. "Padding" means recording, dummy data, zero values, or some other designated padding data to an unrecorded or empty area in a closed SRR in response to the request of a user or according to the determination of a recording/reproducing unit (e.g., unit 10 shown in FIG. 17). "Session" is a common name used to divide the SRRs for compatibility according to the specification for reproduction. One session includes at least one SRR.

The present invention defines different types of SRRs to indicate exactly the recording status of each SRR in a write-once optical disc such as a BD-WO, and provides a structure for the write-once optical disc that would allow recording of such status information on the disc, with a full compatibility to the existing structure and use of the disc.

<SRR Type & Session Type>

An SRR is an area reserved for recording data or information on a write-once optical disc such as a BD-WO. The present invention defines the types of the SRRs according to necessity and/or a recording progress. The detailed description of various SRR types and session types that are defined by the present invention, is provided as follows referring to FIGS. 2A-4G.

FIGS. 2A to 2D illustrate different opened SRR types of SRRs for a write-once optical disc such as a BD-WO according to the present invention. An opened SRR means an SRR in which its area is recordable. "Recordable" means having a next writable address (NWA). Accordingly, the opened SRR is an SRR with an NWA. An unrecordable SRR without NWA is a closed SRR. The closed SRR types will be described later referring to FIGS. 3A to 3E.

Figure 2A:
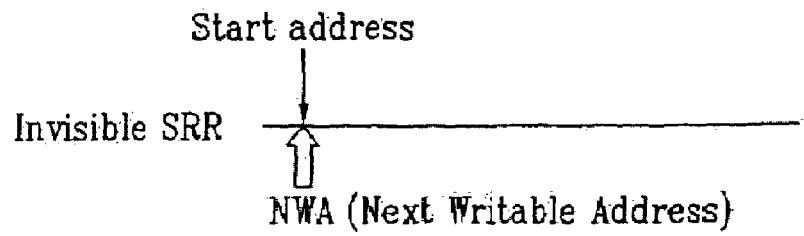
FIGS. 2A to 2D illustrate different opened SRR types of a write-once optical disc according to the present invention.

More specifically, FIG. 2A illustrates a first opened SRR, which is defined by the present inventors as an invisible SRR.

The invisible SRR is an SRR formed in an outmost track area of a blank disc or a disc, which has not been recorded. Such an SRR has only a start address and no end address (i.e., no end to its area). Since the invisible SRR has no recording, its LRA has a zero value and its NWA has the same value as the start address of the invisible SRR.

Figure 2B:
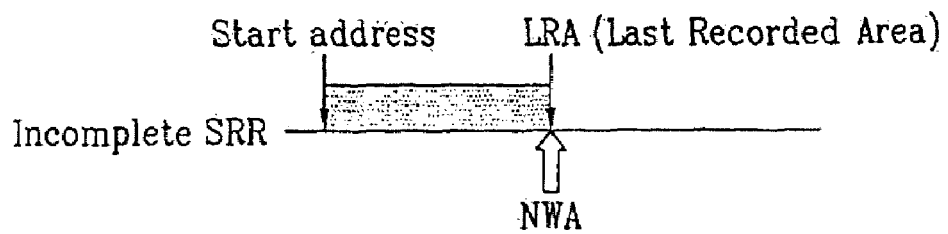

FIG. 2B illustrates a second opened SRR, which is defined by the present inventors as an incomplete SRR. The incomplete SRR is an SRR that is partially recorded from the invisible SRR state shown in FIG. 2A. In other words, an invisible SRR having some incomplete recording is referred to as an incomplete SRR. The incomplete SRR has a start address but no end address. As the SRR is incompletely recorded, its LRA is the address of the last location where the normal data is recorded and its NWA is information corresponding to a location next to the LRA.

Figure 2C:
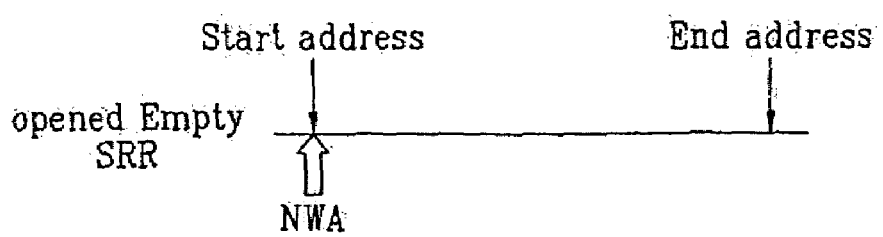

FIG. 2C illustrates a third opened SRR, which is defined by the present inventors as an empty SRR. The empty SRR is an SRR that is formed generally at a middle area of a disc, other than the outermost track of the disc. The empty SRR results when a host or user forms an opened SRR to record but has not recorded any data to the opened SRR. The empty SRR has a start address and an end address, but has not been recorded yet. As a result, the LRA of the empty SRR has a zero value and the NWA has the same value as the start address of the empty SRR.

Figure 2D:
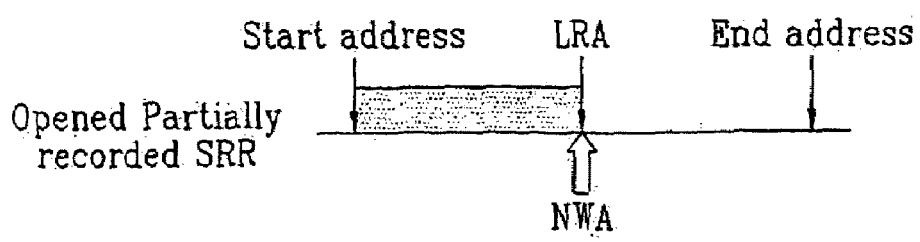

FIG. 2D illustrates a fourth opened SRR, which is defined by the present inventors as a partially recorded SRR. The partially recorded SRR is created when an empty SRR as in FIG. 2C is partially recorded with data. Accordingly, such an SRR has a start address and an end address. Since the SRR is partially recorded, the LRA of the partially recorded SRR is the last location where the normal data is recorded and the NWA of the partially recorded SRR is information corresponding to a location next to the LRA.

Generally, a conventional write-once disc such as a DVD-R has only two opened Rzones. In contrast, a write-once optical disc such as BD-WO according to the present invention does not have such a small limited number of opened SRRs. Instead, the total number of opened SRRs in the BD-WO is either unlimited or is limited to sixteen, so that the disc can be used more efficiently. Accordingly, the present invention also provides a method of recording management information that is different from the conventional recording methods.

FIGS. 3A to 3E illustrate different closed SRR types of a write-once optical disc such as a BD-WO according to the present invention. The closed SRR means an SRR having an unrecordable area. Being "unrecordable" means having no next writable address (NWA). The closed SRR can be reserved since its area is closed to recording. An SRR can be closed forcedly due to a close command from a host or user even though a recordable area remains in the SRR.

Figure 3A:
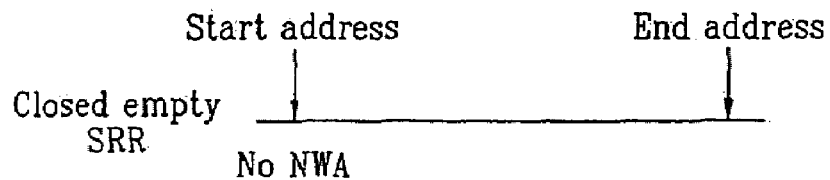
FIGS. 3A to 3E illustrate different closed SRR types of a write-once optical disc according to the present invention.

FIG. 3A illustrates a first closed SRR, which is defined by the present inventors as an empty SRR. The empty SRR is an SRR that is closed without any recording due to a close command received in the opened empty SRR state shown in FIG. 2C.

Figure 3B:
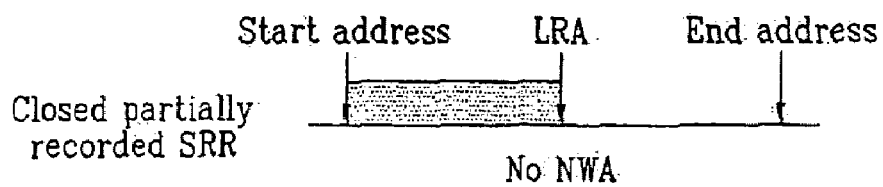

FIG. 3B illustrates a second closed SRR, which is defined by the present inventors as a partially recorded SRR. The partially recorded SRR is an SRR that is closed due to a close command received in the opened partially recorded SRR state shown in FIG. 2D.

Figure 3C:
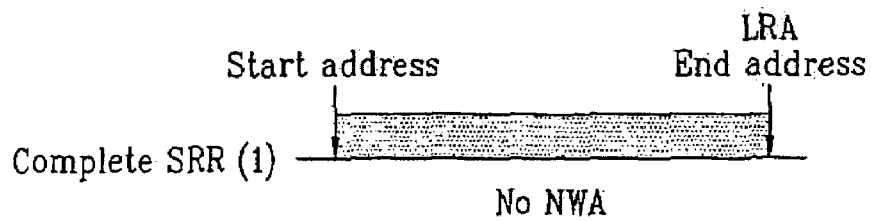

FIG. 3C illustrates a third closed SRR, which is defined by the present inventors as a complete SRR. The complete SRR is an SRR that is recorded fully with normal user data to the end of its area. A complete SRR exists only when the SRR is closed.

Figure 3D:
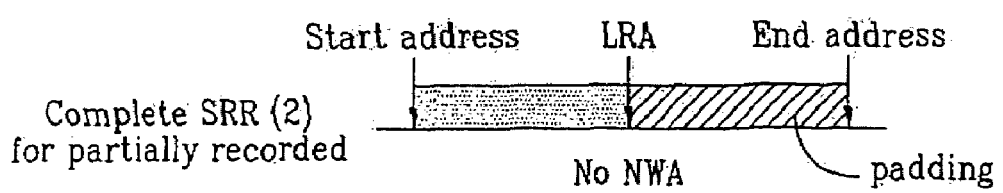

FIG. 3D illustrates a fourth closed SRR, which is defined by the present inventors as another kind of a complete SRR. This complete SRR results when all the recordable (not yet recorded) area of the opened partially recorded SRR shown in FIG. 2D is padded with specific dummy data or zero values and then closed.

Figure 3E:
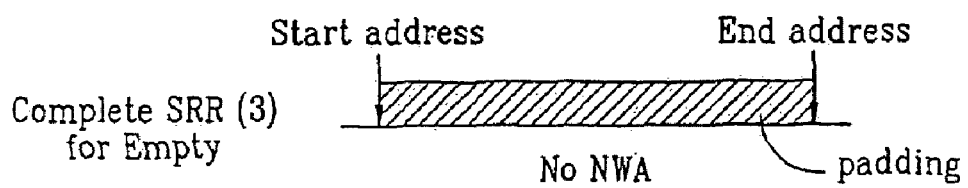

FIG. 3E illustrates a fifth closed SRR, which is defined by the present inventors as another kind of a complete SRR. This complete SRR results when all the recordable (not yet recorded) area of the opened empty SRR shown in FIG. 2C is padded with specific dummy data or zero values and then closed.

As can be seen from FIGS. 3A-3E, in the present invention, the type of an SRR is determined according to whether the unrecorded area is closed without any padding (FIGS. 3A and 3B) or after padding (FIGS. 3D and 3E) when the opened SRR is changed into a closed SRR.

Generally, there are three types of sessions according to the present invention. The first session type is an empty session made up of invisible SRRs. The second session type is an incomplete session that has at least one opened. SRR, but no invisible SRR. The third session type is a complete session made up of closed SRRs. A session has at least one SRR. An incomplete session is changed into a complete session, e.g., due to a session close command.

FIGS. 4A to 4G illustrate, as an example, the steps of a method of reserving or assigning SRRs and sessions in a disc such as a BD-WO according to the present invention. An arrow indicates an NWA.

Particularly, referring to FIG. 4A, in the first step, a blank write-once optical disc such as a BD-WO is provided with its entire area being recordable. In the state shown, the disc has only one SRR, which is an invisible SRR as shown in FIG. 2A, and the NWA of the disc is the start address of the disc. Accordingly, the disc has only on session, so-called, an empty session.

Figure 4B:
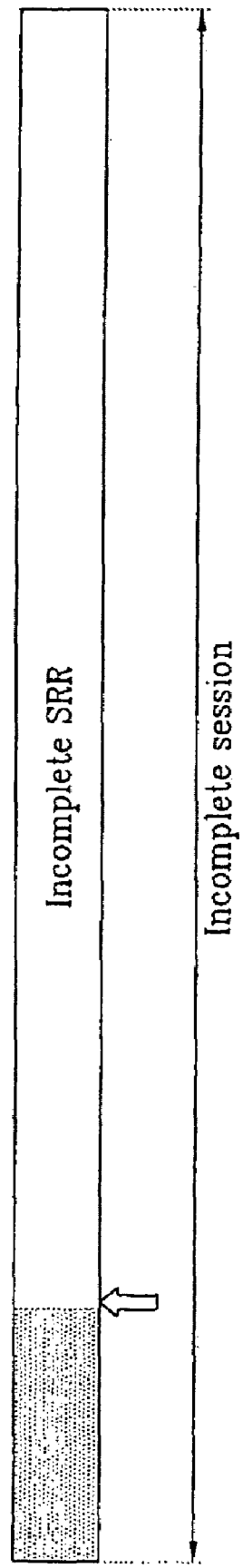

Referring to FIG. 4B, in the second step, the blank disc is partially recorded but its session is not closed. In this state, the disc has only one SRR and this SRR is an incomplete SRR as shown in FIG. 2B. Accordingly, the disc has only one session, so-called, an incomplete session.

Figure 4C:
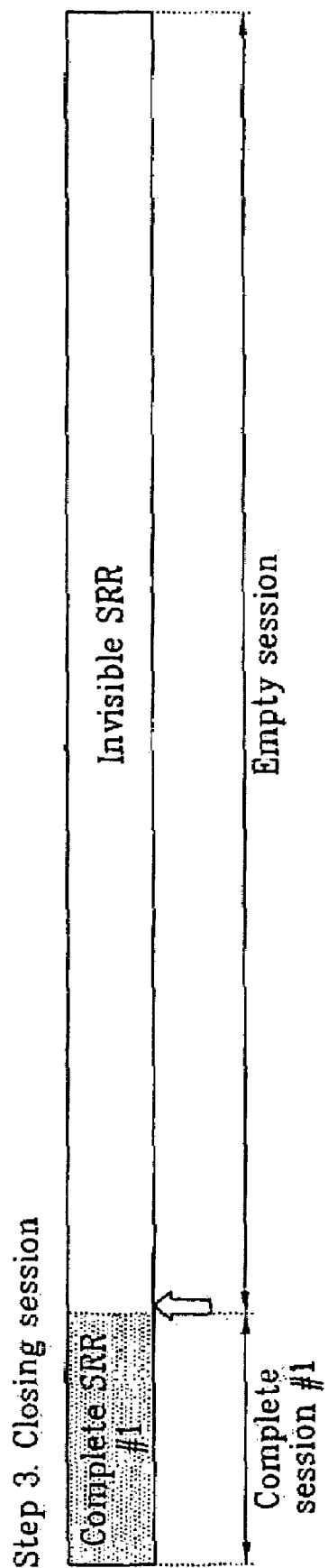

Referring to FIG. 4C, in the third step, the previous session of the disc is closed due to a close command and becomes a complete session #1 having the complete SRR #1. Then a new session is reserved as an empty session, where its unrecorded area is an invisible SRR as shown FIG. 2A.

Figure 4D:
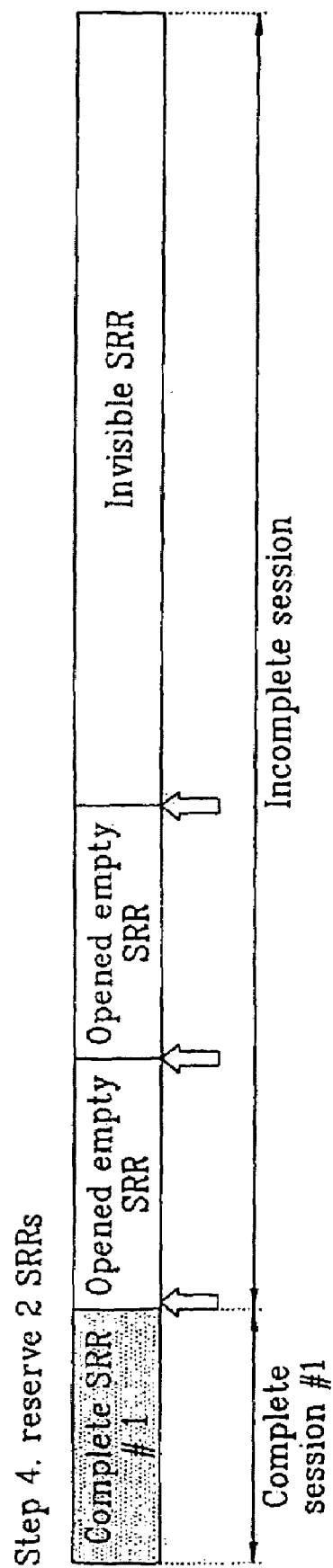

Referring to FIG. 4D, in the fourth step, two opened SRRs are reserved for new recordings. Accordingly, in addition to the complete session #1, the disc has two new opened empty SRRs and the previous empty session is changed into an incomplete session.

Figure 4E:
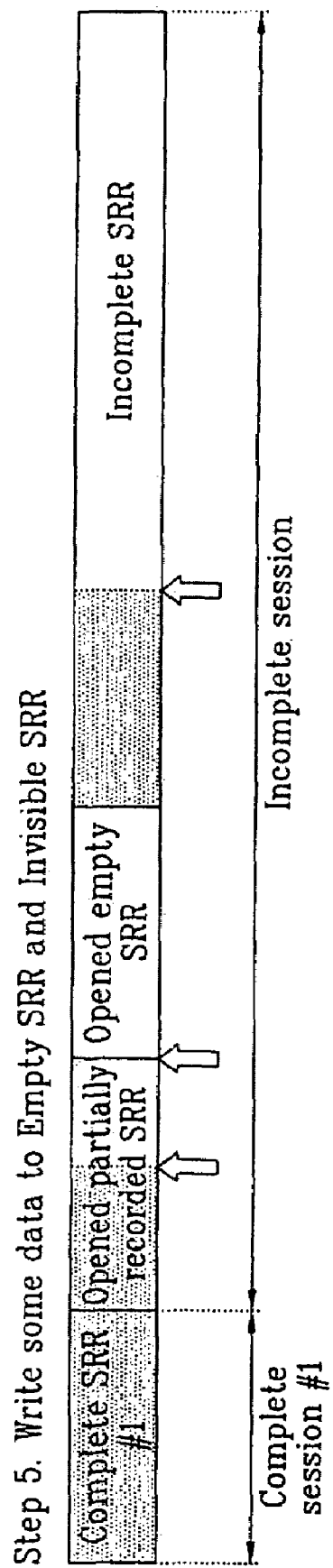

Referring to FIG. 4E, in the fifth step, data are recorded onto the first opened empty SRR of FIG. 4D and onto the invisible SRR of FIG. 4D. Accordingly, the first empty SRR is changed into an opened partially recorded SRR and the invisible SRR is changed into an incomplete SRR. As a result, the disc still has the complete session #1 and the incomplete session.

Figure 4F:
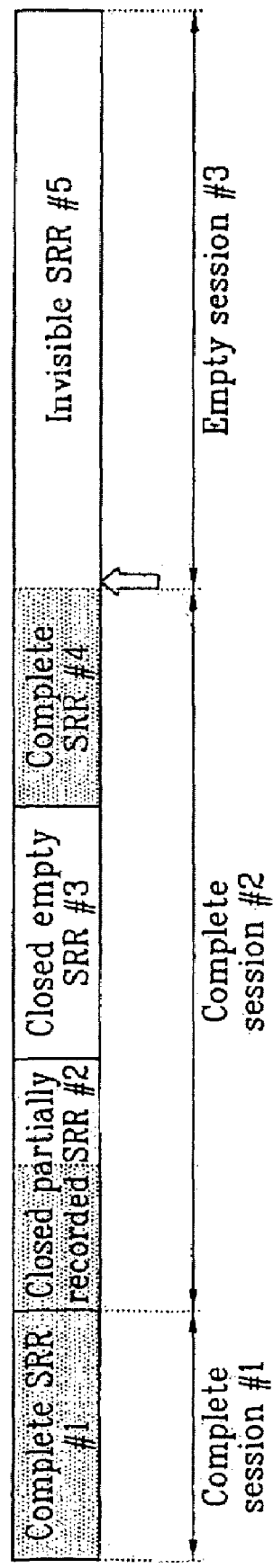
Figure 4G:
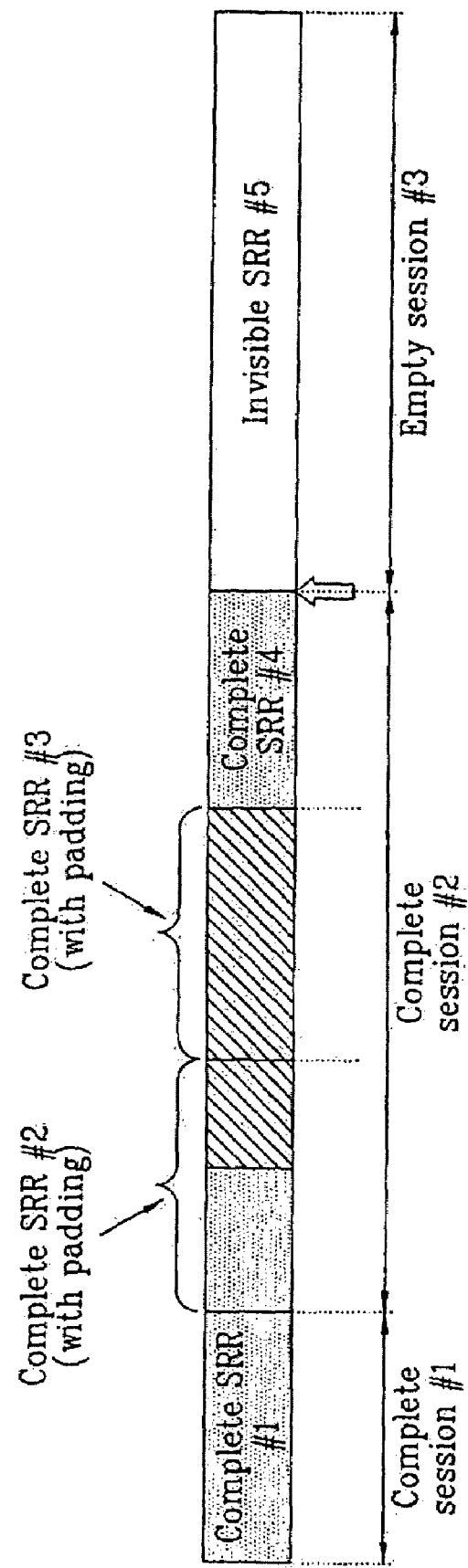

FIGS. 4F and 4G show two possible steps each of which can follow the step of FIG. 4E. In FIG. 4F, a session close command is received and processed to close the session without padding any unrecorded area. As a result, the recorded area in the incomplete session of FIG. 4E becomes an independent new complete session #2 due to the session close command, where all the SRRs in this session become closed SRRs. In other words, the complete session #2 as reserved on the disc includes a closed partially recorded SRR #2, a closed empty SRR #3, and a closed complete SRR #4. The remaining outmost SRR is an opened invisible SRR #5 and is part of an empty session #3.

Alternatively, in FIG. 4G, a session close command is received and processed to close the session without padding the unrecorded area(s). The recorded area then becomes an independent complete session #2 due to the session close command, where all the SRRs in this session are changed into closed SRRs. In other words, as a result of performing the padding operation, the three kinds of complete SRRs #2, #3 and #4 are reserved on the disc as part of the complete session #2. The complete SRR #2 is the opened partially recorded SRR of FIG. 4E that is changed into a closed SRR after padding. The complete SRR #3 is the opened empty SRR of FIG. 4E that is changed into a closed SRR after padding. The complete SRR #4 is a closed SRR having actual user data normally recorded therein. The remaining outmost SRR is an opened invisible SRR #5 which is part of an empty session #3.

As can be seen from FIGS. 4F and 4G, a different kind of SRR can be reserved depending on whether or not there is padding. Accordingly, in order to represent the detail disc recording status of a disc, the present invention provides an innovative SRRI structure and a method of recording SRRI, so that these defined SRR types can be distinguished accurately.

<Optical Disc Structure and SRRI Structure>

FIG. 5 illustrates a structure of a write-once optical disc such as a BD-WO and a method for recording disc management information according to the present invention. The disc shown in FIG. 5 has a single recording layer as an example. But the present invention is not limited to such, and is applicable to a disc having dual or multiple recording layers.

Referring to FIG. 5, the disc includes a lead-in area, a data area, and a lead-out area, all at the recording layer. The lead-in and lead-out areas have a plurality of defect management areas (DMA1-DMA4) for storing the same defect management information repeatedly. In the data area, an inner spare area ISA0 and/or an outer spare area OSA0 for replacing defective areas is provided.

It is known that a rewritable optical disc does not have or need a large defect management area (DMA) since its DMA can be written and erased repeatedly, even if the disc has the DMA of limited size. This is not the case for a write-once optical disc such as a BD-WO. Since the write-once optical disc cannot be re-recorded on the area that was recorded once, the write-once optical disc needs and has a larger management area. To more effectively store management information, in the write-once optical disc the management information is temporarily stored in a temporary defect management area (TDMA). When the disc is ready to be finalized, then the management information stored in the TDMA is transferred to a DMA for more permanent storage.

As shown in FIG. 5, there are two types of TDMA. One is a primary TDMA (PTDMA0) allocated to the lead-in area and having a fixed, non-variable size. The other is an additional TDMA (ATDMA0) allocated to the outer spare area OSA0 and having a size variable in accordance with the size of the spare area. The size P of the ATDMA0 is, for example, P=(N*256)/4 and is preferably a quarter of the size of the entire outer spare area OSA0.

In each of the PTDMA0 and ATDMA0, temporary defect list (TDFL) information and temporary disc definition structure (TDDS) information are recorded in one record unit (e.g., one cluster in case of a BD-WO). In the alternative, in each of the PIDMA0 and ATDMA0, (TDFL+TDDS) information or (SRRI and TDDS) information can be recorded in another record unit.

The TDFL information is composed of 1-4 clusters according to the size of the defect area list. The SRR information identifies whether a specific area (SRR) of the disc is recorded or unrecorded. Especially, the SRR information can be applied when the disc is recorded in a consecutive recording method. The TDDS information is stored at the last sector of thirty-two sectors in one cluster. The TDDS information includes important information on the general disc management and the defect management. The TDDS information is generally always recorded at last whenever the management information is updated in the TDMA.

According to the present invention, each of the plurality of SRRIs 60 includes three parts: a header 50 for causing the SRRI to be recognized, a list of SRR entries (SRR entry list) 30 including SRR type information, and an SRR list terminator 40 for identifying the termination of the corresponding SRRI.

The SRRI header 50 is located at the front of the corresponding SRRI 60 and includes an "SRRI structure identifier" field 51 for causing the corresponding SRRI to be recognized, a "List of opened SRRs" field 52 for identifying the location of each opened SRR in the corresponding SRRI, a "Number of SRR entries" field 53 for identifying the total number of all SRRs, and a "Number of opened SRRs" field 54 for identifying the number of opened SRRs. By accessing the SRRI header 50, the general contents of the entire SRRI 60 can be known without having to access the SRR entry list 30 directly. Accordingly, it is possible to newly define any new SRR types or other necessary information and to insert this information into the header 50.

The SRR entry list ("List of SRR entries") 30 is recorded after the SRRI header 50. When the SRR entry list 30 is terminated, the termination of the SRR entry list 30 is identified with the SRR list terminator ("SRR List Terminator") 50. Specifically, the SRR list terminator 50 is information identifying the termination of the corresponding SRR information when the SRR information has a variable size.

Accordingly, as the disc management information, the SRR information includes the header, the SRR entry list and the SRR list terminator. Such information is recorded in the TDMA and updated as needed.

The SRR entry list 30 lists a plurality of SRR entries 35. Eight bytes are allocated to each SRR entry 35, and one SRR entry 35 represents information on one SRR reserved on the disc.

Each SRR entry 35 includes recording status information (SRR type information) (31) for the corresponding SRR, start address information (32) for the corresponding SRR, and last recorded address (LRA) information (34) for the corresponding SRR. The SRR type information identifies an SRR type of an SRR using the various SRR types defined by the present invention as discussed in connection with FIGS. 2A-3E.

<SRR Entry Structure>

Figure 6:
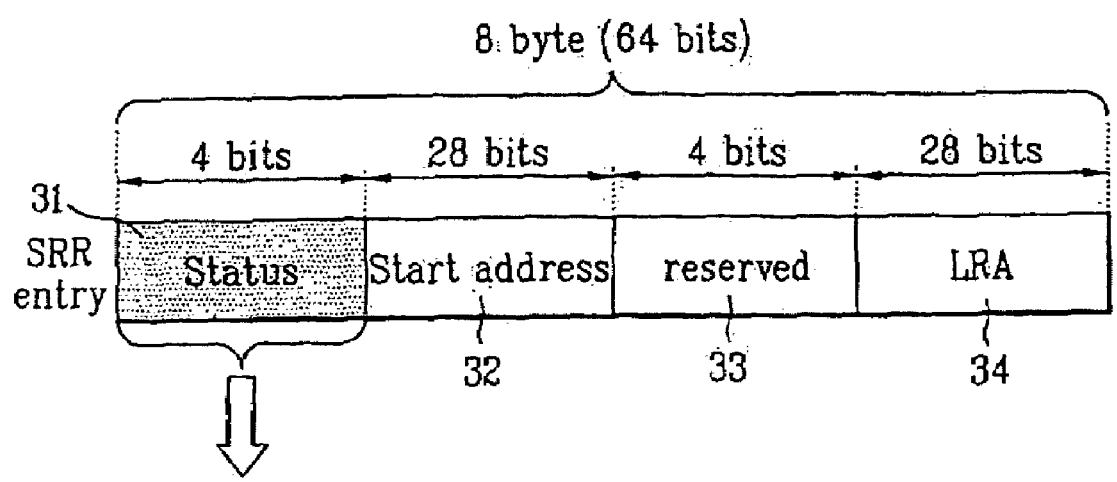
FIG. 6 illustrates an SRR entry recordable: on a write-once optical disc according to a first embodiment of the present invention.

FIG. 6 illustrates an example of an SRR entry 35 according to a first embodiment of the present invention. As shown in FIG. 6, each SRR entry 35 includes a "Status" field 31 for storing 4-bit SRR type information, a "Start address" field 32, a "reserved" field 33 and an "LRA" field 34.

The appropriate SRR type information for the corresponding SRR is recorded in the Status field 31, so that by accessing the Status field 31, the recording status of the SRR can be known. Particularly, any one of the nine different SRR types discussed above in connection with FIGS. 2A-3E can be represented in the Status field 31. In this regard, the complete SRRs with padding shown in FIGS. 3D and 3E are grouped together as one type.

As an example, if the Status field 31 has a value "0000b", it means the corresponding SRR is an opened invisible SRR, e.g., as shown in FIG. 2A. If the Status field 31 has a value "0001b", it means the corresponding SRR is an opened incomplete SRR, e.g., as shown in FIG. 2B. If the Status field 31 has a value "0010b", it means the corresponding SRR is an opened empty SRR, e.g., as shown in FIG. 2C. If the Status field 31 has a value "0011b", it means the corresponding SRR is an opened partially recorded SRR, e.g., as shown in FIG. 2D. If the Status field 31 has a value "0100b", it means the corresponding SRR is a closed empty SRR, e.g., as shown in FIG. 3A. If the Status field 31 has a value "0101b", it means the corresponding SRR is a closed partially recorded SRR, e.g., as shown in FIG. 3B. If the Status field 31 has a value "0110b", it means the corresponding SRR is a closed complete SRR with an unrecorded area padded with dummy data, e.g., as shown in FIGS. 3D and 3E. If the Status field 31 has a value "0111b", it means the corresponding SRR is a closed complete SRR without any padding, e.g., as shown in FIG. 3C.

The Start address field 32 has the size of twenty-eight bits and is used to record the start address information of the corresponding SRR, that is, the address of the start location of the SRR. Generally, this is represented as a physical sector number (PSN).

The Reserved field 33 has the size of four bits and is reserved for specification variations.

The LRA field 34 has the size of twenty-eight bits and is used to record the last recorded address information (LRA) of the corresponding SRR. This field has information on the last location of user data (except for padding data) that is recorded in the SRR.

Figure 7A:
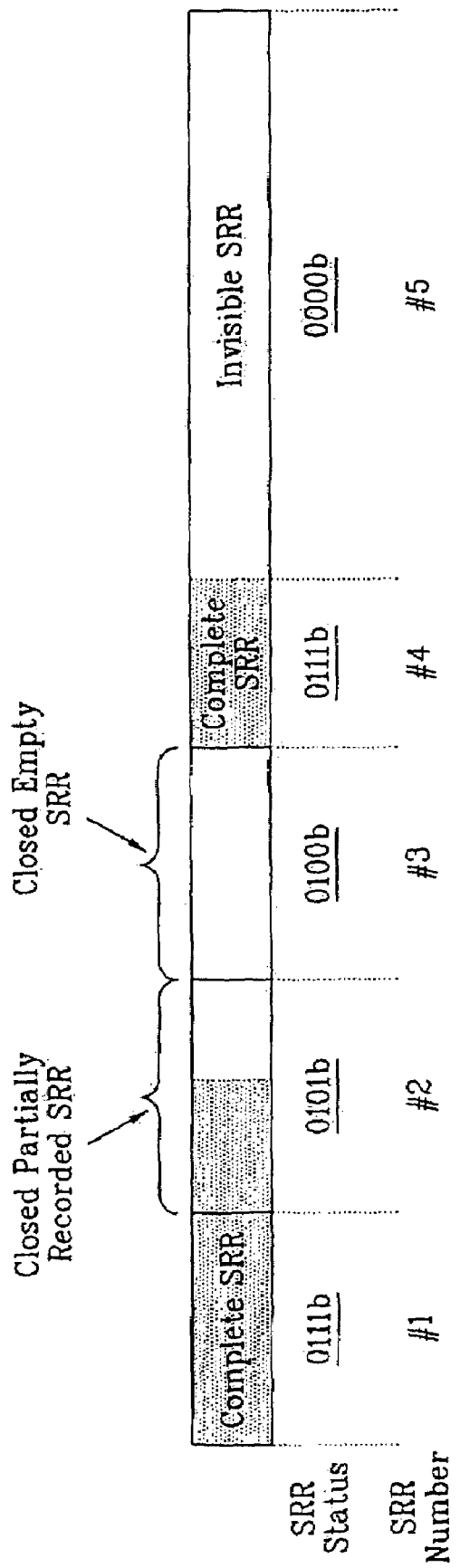
FIGS. 7A and 7B illustrate an application of the SRR entry structure of FIG. 6 to the cases of FIGS. 4F and 4G, respectively.
Figure 7B:
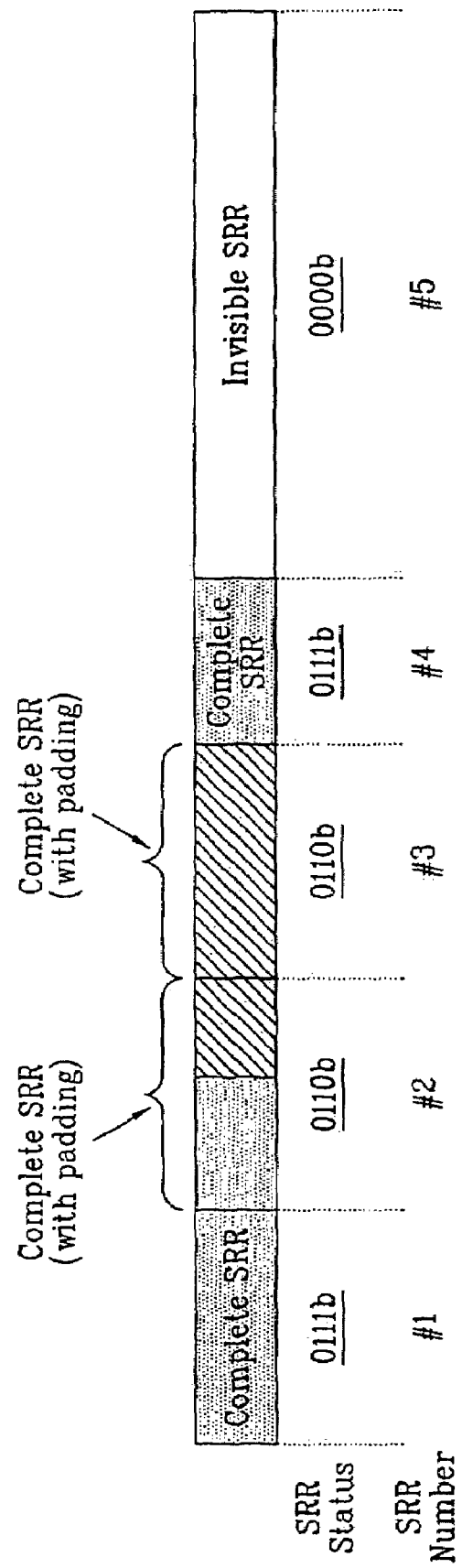

FIGS. 7A and 7B illustrate respectively how the SRR type information as defined in FIG. 6 can be applied to indicate the recording status of each SRR shown in FIG. 4F (without padding) and FIG. 4G (with padding).

Referring to FIG. 7A, the SRR #1 is a complete SRR without padding and this status is indicated with "0111b" in the Status field 31. The SRR #2 is a closed partially recorded SRR without padding and this status is indicated with "0101b" in the Status field 31. The SRR #3 is a closed empty SRR without padding and this status is indicated with "0100b" in the Status field 31. The SRR #4 is a complete SRR without padding and this status is indicated with "0111b" in the Status field 31.

The SRR #5 is an invisible SRR and this status is indicated with "0000b" in the Status field 31.

On the other hand, referring to FIG. 7B, the SRR #1 is a complete SRR without padding and this status is indicated with "0111b" in the Status field 31. The SRR #2 is a complete SRR with padding and this status is indicated with "0111b" in the Status field 31. The SRR #3 is a complete SRR with padding and this status is indicated with "0110b" in the Status field 31. The SRR #4 is a complete SRR without padding and this status is indicated with "0111b" in the Status field 31. The SRR #5 is an invisible SRR and this status is indicated with "0000b" in the Status field 31.

Accordingly, using the different SRR types defined as shown in FIG. 6 and the Status field, the exact disc recording status can be known and managed more effectively.

Figure 8:
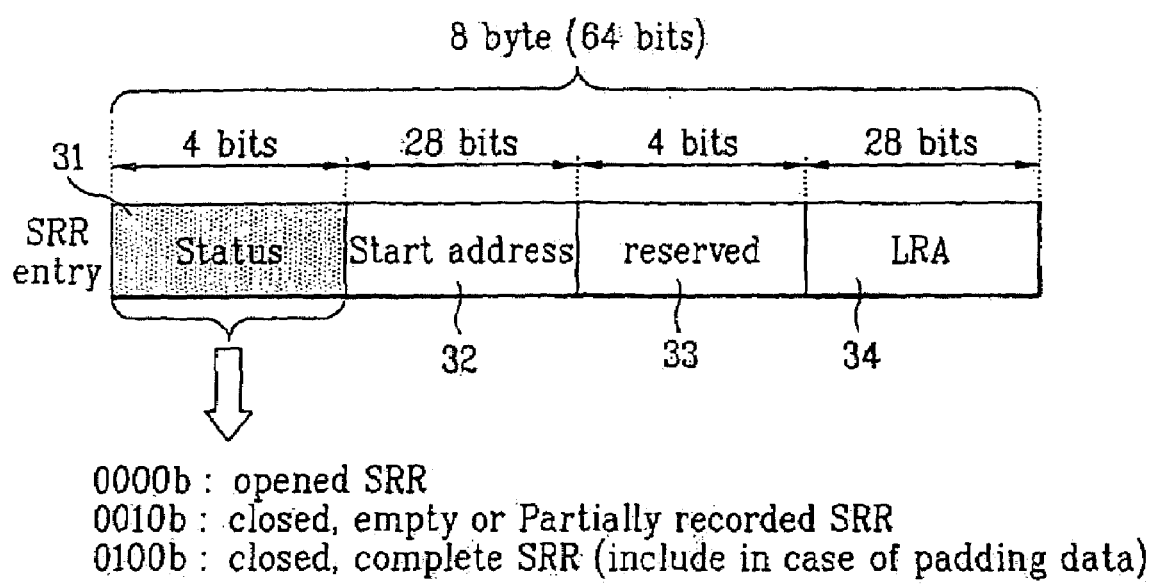
FIG. 8 illustrates an SRR entry recordable on a write-once optical disc according to a second embodiment of the present invention.

FIG. 8 illustrates an SRR entry according to a second embodiment of the present invention. In this embodiment, the SRR entries are classified into opened SRRs and closed SRRs. And the closed SRRs are classified according to whether or not padding is used. Since the basic structure of the SRR entry in this second embodiment is the same as the first embodiment of FIG. 6, the description corresponding to the same features of the SRR entry (as represented by the use of the same or like reference numerals) will be omitted.

Referring to FIG. 8, three different SRR types defined in this second embodiment are an opened SRR, a closed empty or partially recorded SRR, and a closed complete SRR. Thus one of these three different SRR types is indicated in the Status field 31 of an SRR entry according to the recording status (SRR type) of the SRR entry.

For instance, if the Status field 31 has a value "0000b" it means the corresponding SRR is an opened SRR and can be any one kind of opened SRRs shown in FIGS. 2A-2D. If the Status field 31 has a value "0010b," it means the corresponding SRR is a closed empty SRR with padding or a closed partially recorded SRR as shown in FIGS. 3A and 3B. If the status field 31 has a value "0100b," it means the corresponding SRR is a complete SRR including the case in which data is fully recorded as shown FIG. 3C or the case in which the recording is completed with padding as shown in FIG. 3D or 3E.

The reason why the SRR type information of the Status field 31 in the second embodiment can be defined simpler that that in the first embodiment is as follows. The LRAs of the SRRs in FIGS. 3C, 3D and 3E are different from each other although the SRRs are all complete SRRs. Similarly, the opened SRRs of FIGS. 2A-2D have different starting addresses and LRAs. Then using the Status field 31 along with the LRA field 34 and the start address field 32, the type of the SRR can be identified further.

Figure 9A:
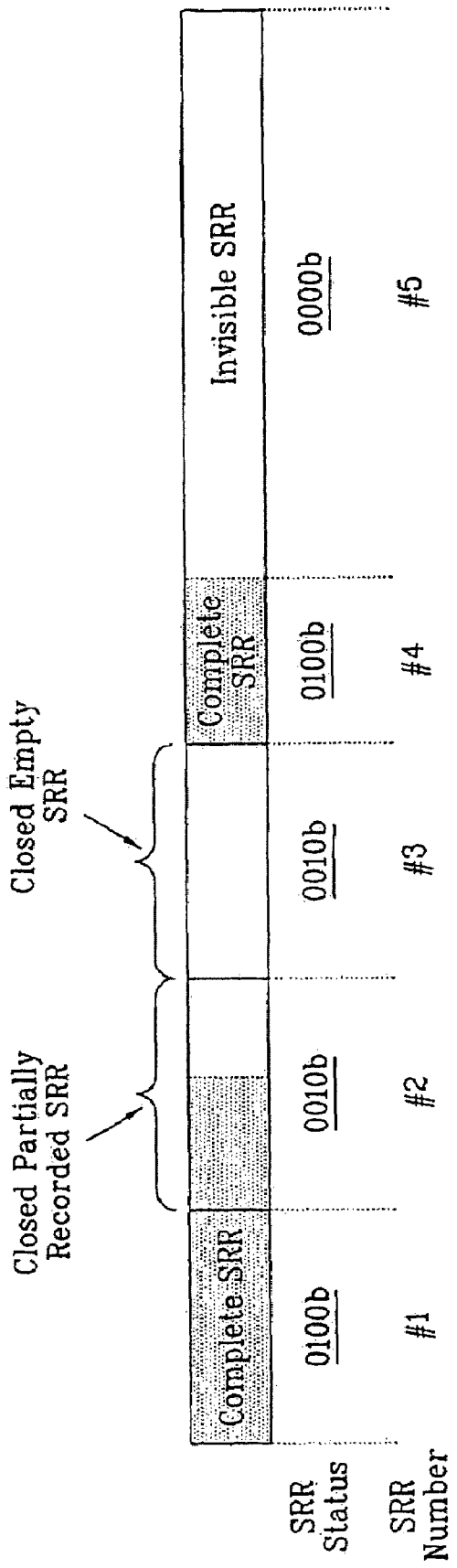
FIGS. 9A and 9B illustrate an application of the SRR entry structure of FIG. 8 to the cases of FIGS. 4F and 4G, respectively.
Figure 9B:
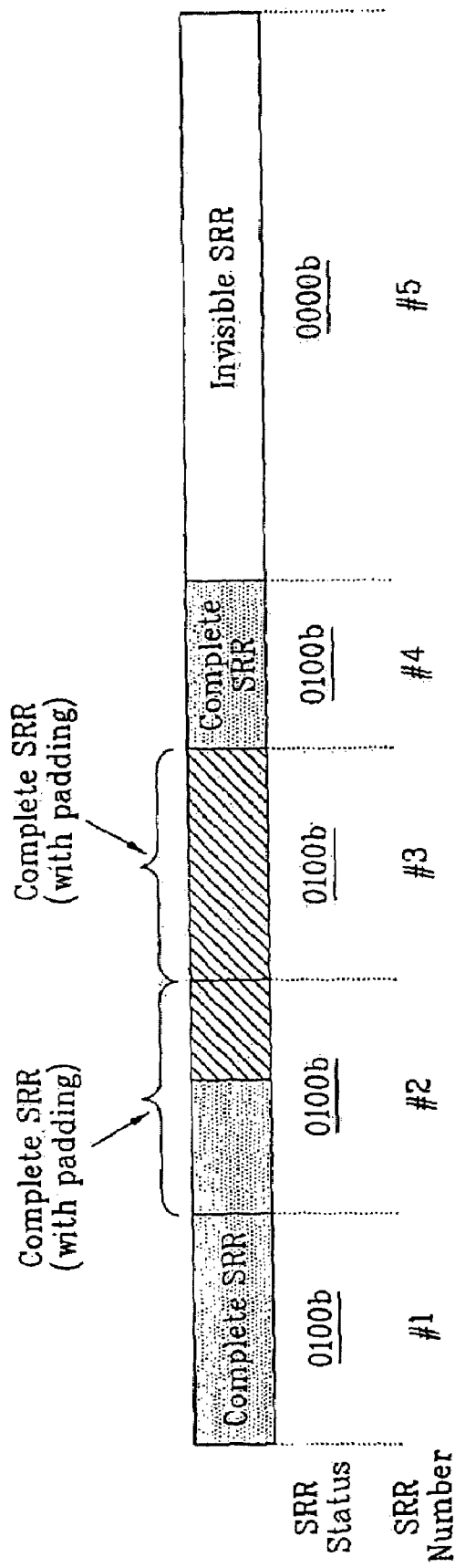

FIGS. 9A and 9B illustrate respectively how the SRR type information as defined in FIG. 8 can be applied to indicate the recording status of each SRR shown in FIG. 4F (without padding) and FIG. 4G (with padding).

Referring to FIG. 9A, the SRR #1 is a complete SRR and this status is indicated with "0100b" in the Status field 31. The SRR #2 is a closed partially recorded SRR without padding and this status is indicated with "0010b" in the Status field 31. The SRR #3 is a closed empty SRR without padding and this status is indicated with "0010b" in the Status field 31. The SRR #4 is a complete. SRR and this status is indicated with "0100b" in the Status field 31. The SRR #5 means an invisible SRR and this status is indicated with "0000b" in the Status field 31.

On the other hand, referring to FIG. 9B, the SRR #1 is a complete SRR and this status is indicated with "0100b" in the Status field 31. The SRR #2 is a complete SRR with padding and this status is indicated with "0100b" in the Status field 31. The SRR #3 is a complete SRR with padding and this status is indicated with "0100b" in the Status field 31. The SRR #4 is a complete SRR and this status is indicated with "0100b" in the Status field 31. The SRR #5 is an invisible SRR and this status is indicated with "0000b" in the Status field 31.

Figure 10:
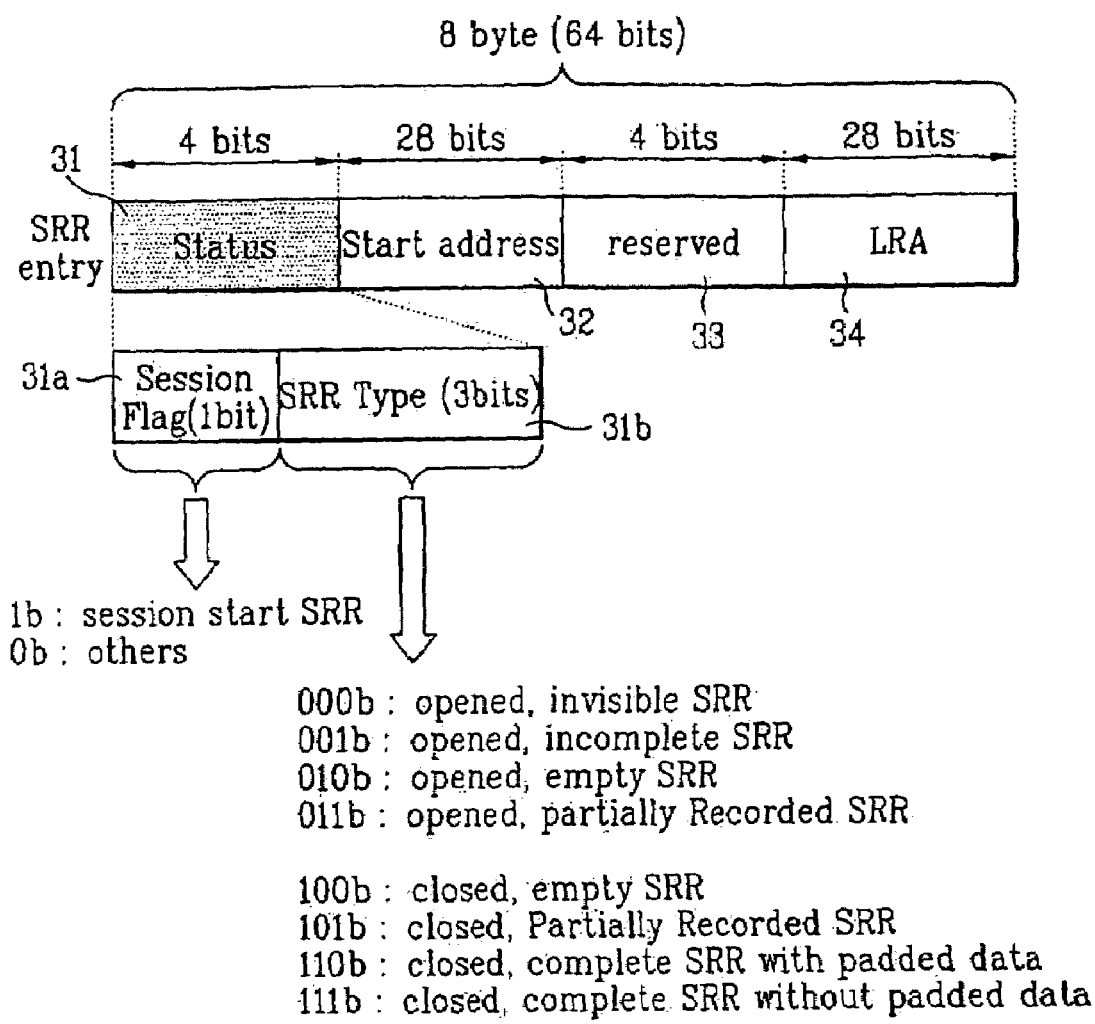
FIG. 10 illustrates an SRR entry recordable on a write-once optical disc according to a third embodiment of the present invention.

FIG. 10 illustrates an SRR entry according to a third embodiment of the present invention. Similar to the first embodiment of FIG. 6, this embodiment provides the SRR type information in the Status field 31. But it further provides session information in the Status field 31. Since the basic structure of the SRR entry in this third embodiment, is the same as the first embodiment of FIG. 6, the description corresponding to the same features of the SRR entry (as represented by the use of the same or like reference numerals) will be omitted.

Referring to FIG. 10, the Status field 31 is divided into two parts 31a and 31b. The first part 31a has a 1 bit size and stores therein session flag (S-flag) information. The S-flag information indicates whether or not the corresponding SRR is the start of a session. The second part 31b or the three remaining bits of the Status field 31 store therein SRR Type information 31b identifying the SRR types in the same manner as the first embodiment as shown in FIG. 6.

More specifically, if one heading bit (S-flag) 31a of the Status field 31 is "1b", it means the corresponding SRR is the start SRR of a session. If the first part 31a has a value "0b", then the corresponding SRR is not the start SRR of a session.

If the second part 31b (the three remaining bits) of the Status field 31 has a value "000b," it means the corresponding SRR is an opened invisible SRR, e.g., as shown in FIG. 2A. If the second part 31b has a value "001b," it means the corresponding SRR is an opened incomplete SRR, e.g., as shown in FIG. 2B. If the second part 31b has a value "010b," it means the corresponding SRR is an opened empty SRR, e.g., as shown in FIG. 2C. If the second part 31b has a value "011b," it means the corresponding SRR is an opened partially recorded SRR, e.g., as shown in FIG. 2D. If the second part 31b has a value "100b," it means the corresponding SRR is a closed empty SRR, e.g., as shown in FIG. 3A. If the second part 31b has a value "101b," it means the corresponding SRR is a closed partially recorded SRR, e.g., as shown in FIG. 3B. If the second part 31b has a value "110b," it means the corresponding SRR is a closed complete SRR with padding, e.g., as shown in FIGS. 3D and 3E. If the second part 31b has a value "111b," it means the corresponding SRR is a closed complete SRR without padding, e.g., as shown in FIG. 3C.

Figure 11A:
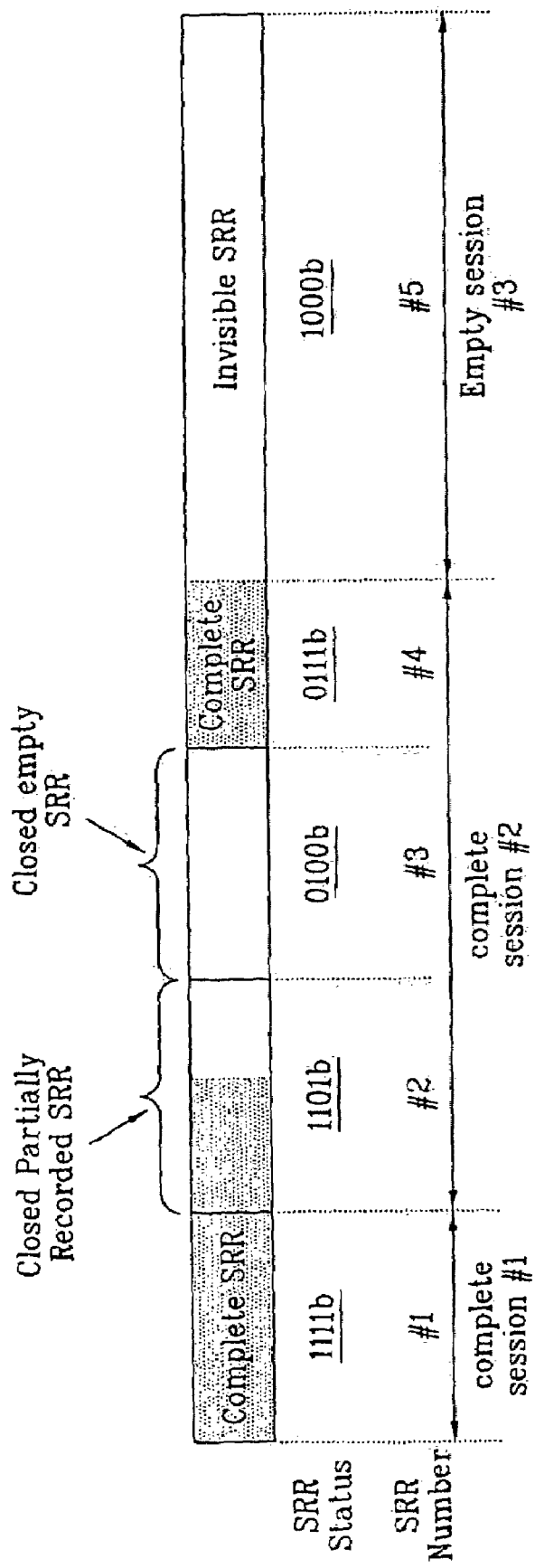
FIGS. 11A and 11B illustrate an application of the SRR entry structure of FIG. 10 to the cases of FIGS. 4F and 4G, respectively.
Figure 11B:
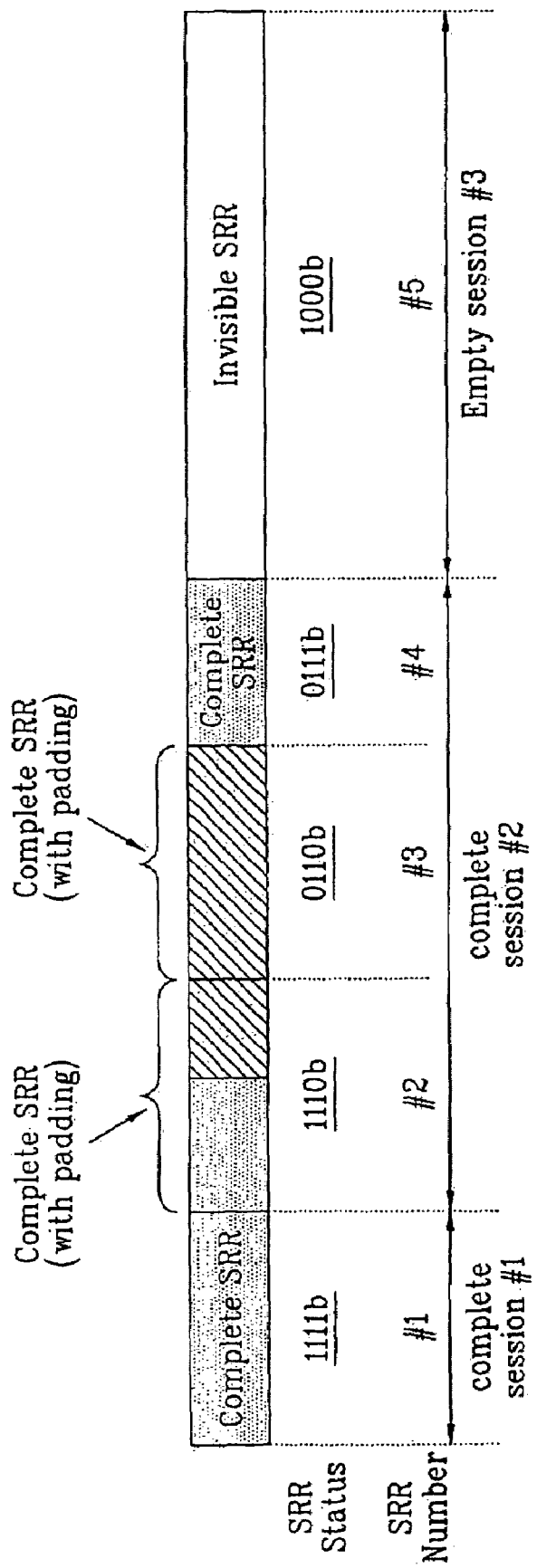

FIGS. 11A and 11B illustrate respectively how the SRR type information and session information as defined in FIG. 10 can be applied to indicate the recording status of each SRR and session shown in FIG. 4F (without padding) and FIG. 4G (with padding).

Referring to FIG. 11A, since the SRR #1 is a complete SRR without padding and also is the start SRR of the session #1, this status is indicated with "1111b" in the Status field 32. That is, this four-bit Status field 31 includes the one-bit session flag (31a) and the remaining three-bits SRR type information (31b) as discussed above. Since the SRR #2 is a closed partially recorded SRR without padding and also is the start SRR of the session #2, this status is indicated with "1101b" in the Status field 31. Since the SRR #3 is a closed empty SRR without padding but is not the start SRR of, the session #2, this status is indicated with "0100b" in the Status field 31. Since the SRR #4 is a complete SRR without padding but is not the start SRR of the session #2, this status is indicated with "0111b" in the Status field 31. Since the SRR #5 is an invisible SRR and also is the start SRR of the session #3, this status is indicated with "1000b" in the Status field 31.

On the other hand, referring to FIG. 11B, since the SRR #1 is a complete SRR without padding and also is the start SRR of the session #1, this status is indicated with "1111b" in the Status field 31. Since the SRR #2 is a complete SRR with padding and also is the start SRR of the session #2, this status is indicated with a "1110b" in the Status field 31. Since the SRR #3 is a complete SRR with padding but is not the start SRR of the session #2, this status is indicated with "0110b" in the Status field 31. Since the SRR #4 is a complete SRR without padding but is not the start SRR of the session #2, this status is indicated with "0111b" in the Status field 31. Since the SRR #5 is an invisible SRR and also is the start SRR of the session #3, this status is indicated with "1000b" in the Status field 31.

Accordingly, since both the session start information and the SRR type information are provided in the Status field of each SRR entry, the type of each SRR and the start location of each session can be known and used to more effectively manage and utilize the disc.

Figure 12:
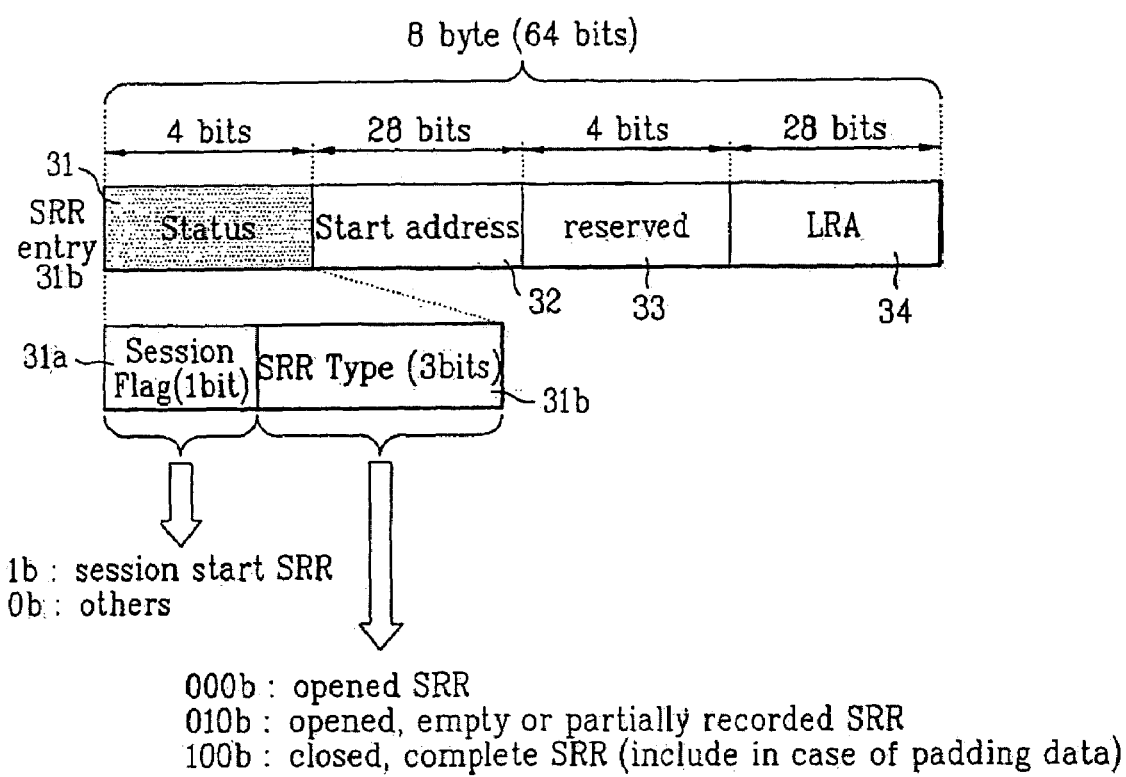
FIG. 12 illustrates an SRR entry recordable on a write-once optical disc according to a fourth embodiment of the present invention.

FIG. 12 illustrates an SRR entry according to a fourth embodiment of the present invention. This fourth embodiment is identical to the third embodiment shown in FIG. 10, except that the second part (3 bits) 31b of the Status field 31 of each SRR entry identifies the three different SRR types defined in FIG. 8, instead of the eight different SRR types defined in FIG. 10. That is, the Status field 31 includes the 1-bit S-flag and the 3-bits SRR type information, where the SRR type information is represented as one of "000b", "010b" and "100b".

Figure 13A:
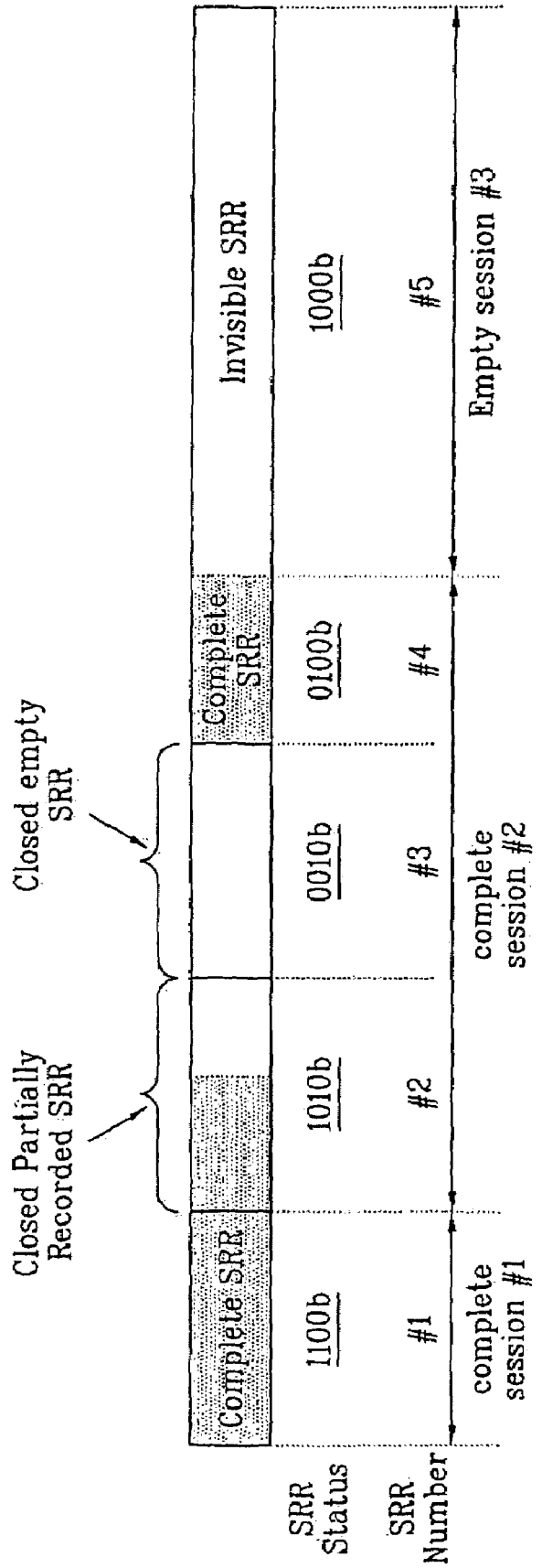

FIGS. 13A and 13B illustrate respectively how the SRR type information and session information as defined in FIG. 12 can be applied to indicate the recording status of each SRR and session shown in FIG. 4F (without padding) and FIG. 4G (with padding).

Referring to FIG. 13A, since the SRR #1 is a complete SRR and also is the start SRR of the session #1, this status is indicated with "1100b" in the Start field 31. Since the SRR #2 is a closed partially recorded SRR without padding and also is the start SRR of the session #2, this status is indicated with "1010b" in the Status field 31. Since the SRR #3 is a closed empty SRR without padding but is not the start SRR of the session #2, this status is indicated with "0010b" in the Status field 31. Since the SRR #4 is a complete SRR but is not the start SRR of the session #2, this status is indicated with "1000b" in the Status field 31. Since the SRR #5 is an opened invisible SRR and also is the start SRR of the session #3, this status is indicated with "1000b" in the Status field 31.

On the other hand, referring to FIG. 13B, since the SRR #1 is a complete SRR and also is the start SRR of the session #1, this status is indicated with "1100b" in the Status field 31. Since the SRR #2 is a complete SRR with padding and also is the start SRR of the session #2, this status is indicated with "1100b" in the Status field 31. Since the SRR #3 is a complete SRR with padding but is not the start SRR of the session #2, this status is indicated with "0100b" in the Status field 31. Since the SRR #4 is a complete SRR but is not the start SRR of the session #2, this status is indicated with "0100b" in the Status field 31. Since the SRR #5 is an opened invisible SRR and also is the start SRR of the session #3, this status is indicated with "1000b" in the Status field 31.

Figure 14:
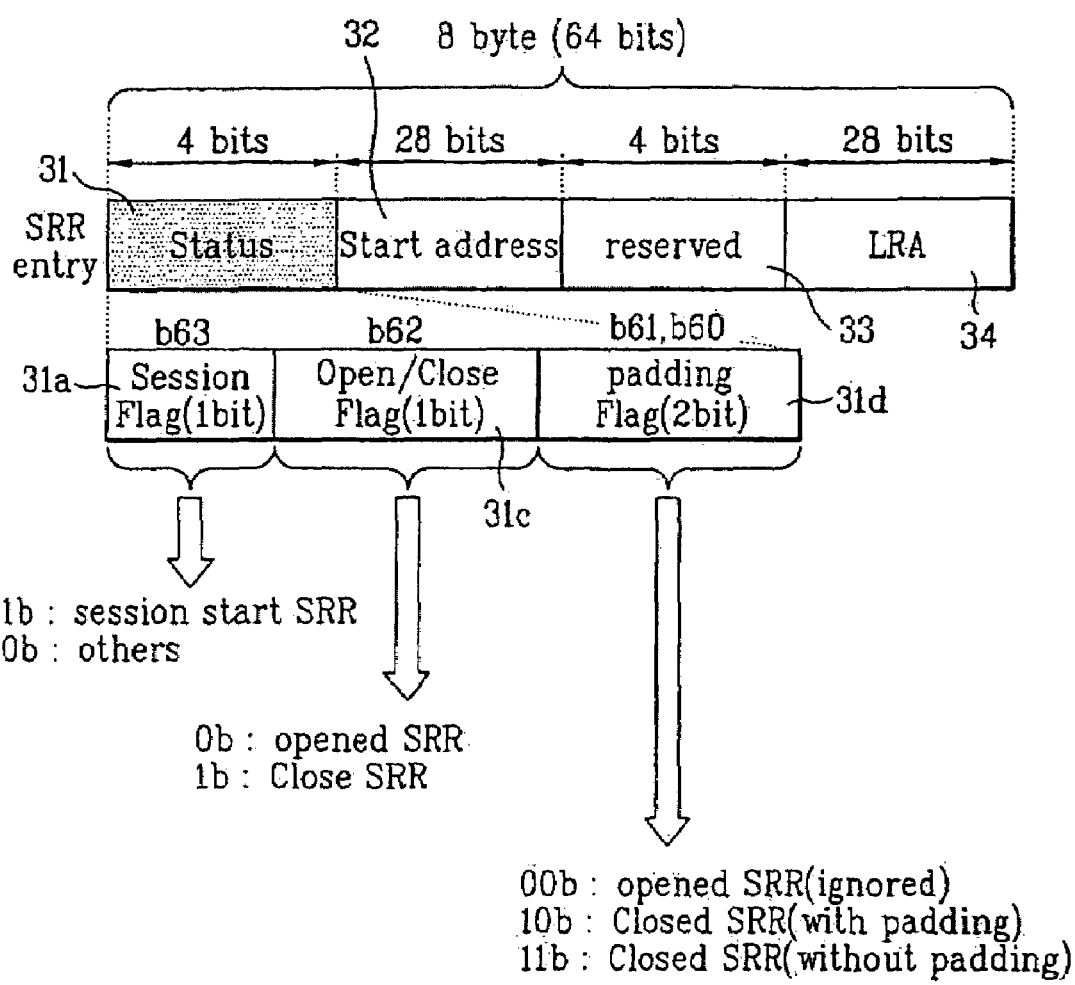
FIG. 14 illustrates an SRR entry recordable on a write-once optical disc according to a fifth embodiment of the present invention.

FIG. 14 illustrates an SRR entry according to a fifth embodiment of the present invention. Sessions, opened/closed SRR and padding of the closed SRR can be identified with separately allocated bit(s). Referring to FIG. 14, the Status field 31 of each SRR entry is divided into the first part 31a (S-flag), a second part 31c being an open/close flag, and a third part 31d being a padding flag.

The first heading bit b63 (31a) of the Status field 31 is designated to carry the S-flag information indicating whether the corresponding SRR is the start of a session. The use and definition of the S-flag information here is the same as the S-flag information (31a) in the previous embodiments. One next bit b62 (31c) is designated as the open/close flag indicating whether the corresponding. SRR is an opened SRR or a closed SRR. The two remaining bits b61 and b60 (31d) of the Status field 31 are designated as a padding flag indicating whether or not the closed SRR is padded.

As an example, if the open/close flag (31c) has a value "0b", it means the corresponding SRR is an opened SRR. If the open/close flag (31c) has a value "1b", it means the corresponding SRR is a closed SRR.

As an example, if the two remaining bits (31d) of the Status field 31 (i.e., the padding flag) are "00b", it means the corresponding SRR is an opened SRR regardless of whether it is padded or not. If the padding flag has a value "10b", it means the corresponding SRR is a closed SRR with padding. If the padding flag has a value "11b", it means the corresponding SRR is a closed SRR without padding.

Figure 15A:
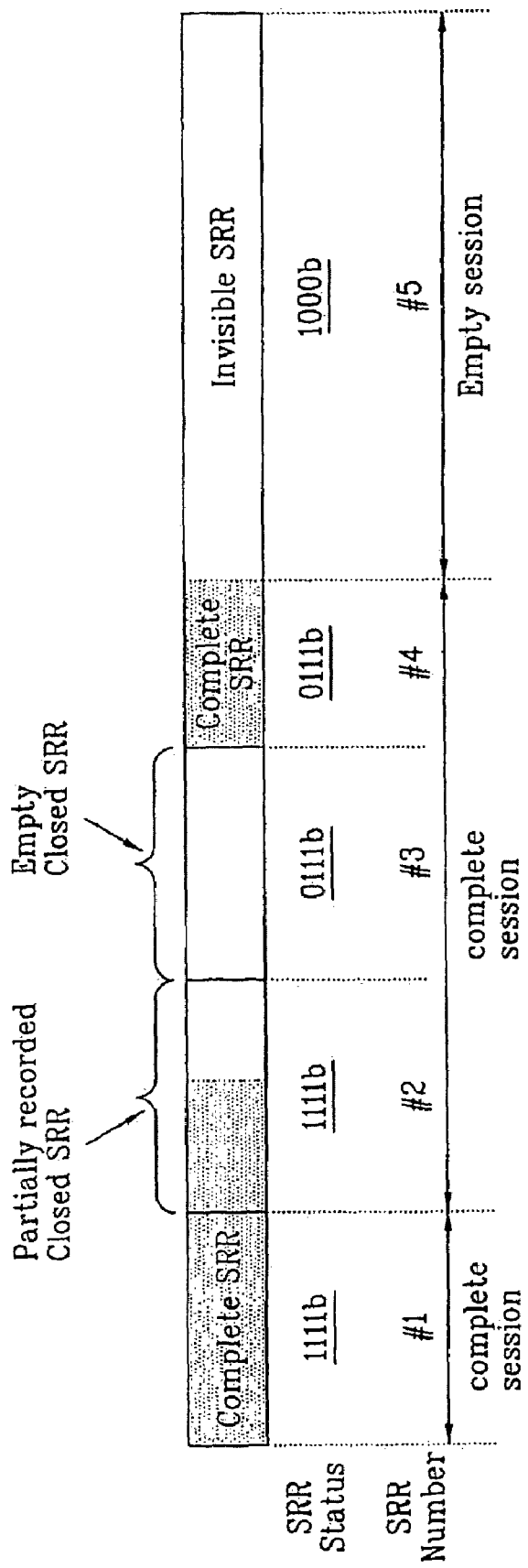
FIGS. 15A and 15B illustrate an application of the SRR entry structure of FIG. 14 to the cases of FIGS. 4F and 4G, respectively.
Figure 15B:
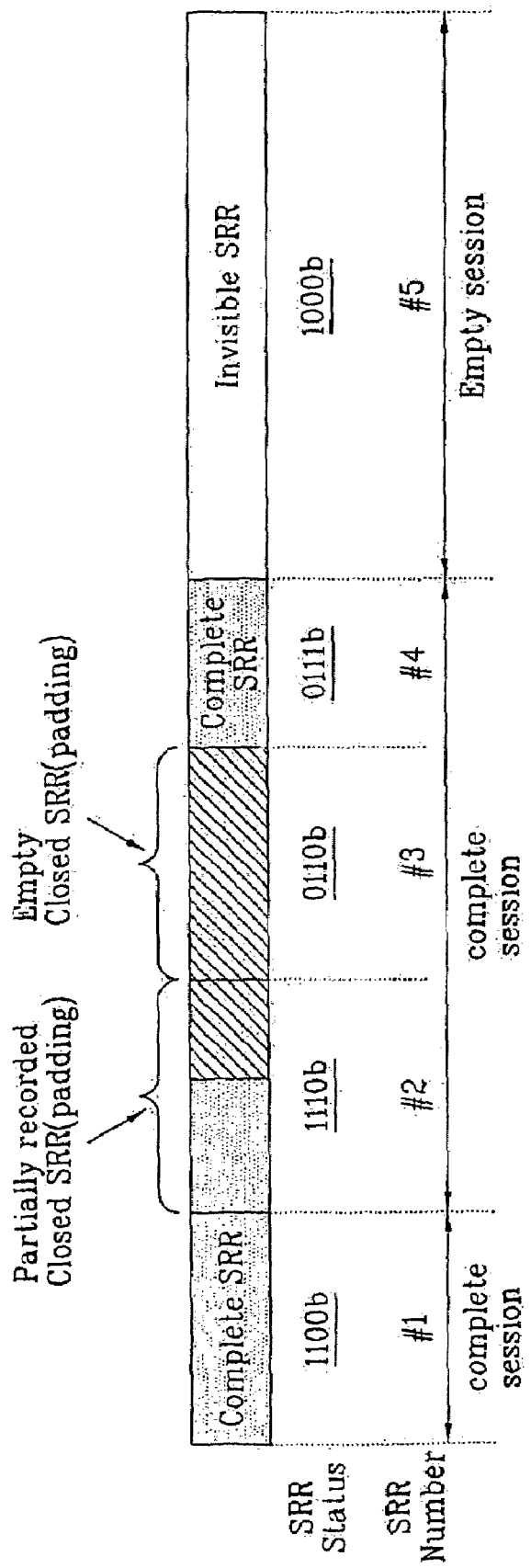

FIGS. 15A and 15B illustrate respectively how the SRR type information and session information as defined in FIG. 14 can be applied to indicate the recording status of each SRR and session shown in FIG. 4F (without padding) and FIG. 4G (with padding).

Referring to FIG. 15A, since the SRR #1 is a complete SRR without padding and also is the start SRR of the session #1, this status is indicated with "1111b" in the Status field 31. Since the SRR #2 is a closed partially recorded SRR without padding and also is the start SRR of the session #2, this status is indicated with "1111b" in the Status field 31. Since SRR #3 is a closed empty SRR without padding but is not the start SRR of the session #2, this status is indicated with "0111b" in the Status field 31. Since the SRR #4 is a complete SRR without padding but is not the start SRR of the session #2, this status is indicated with "0111b" in the Status field 31. Since the SRR #5 is an opened invisible SRR and also is the start SRR of the session #3, this status is indicated with "1000b" in the Status field 31.

On the other hand, referring to FIG. 15B, since the SRR #1 is a complete SRR without padding and also is the start SRR of the session #1, this status is indicated with "1111b" in the Start field 31. Since the SRR #2 is a complete SRR with padding and also is the start SRR of the session #2, this status is indicated with "1110b" in the Start field 31. Since the SRR #3 is a complete SRR with padding but is not the start SRR of the session #2, this status is indicated with "0110b" in the Status field 31. Since the SRR #4 is a complete SRR without padding but is not the start SRR of the session #2, this status is indicated with "0111b" in the Status field 31. Since the SRR #5 is an opened invisible SRR and also is the start SRR of the session #3, this status is indicated with "1000b" in the Status field 31.

Since in the fifth embodiment the session start information, the opened/closed SRR indicating information and the padding information can be indicated separately using the different flags or bits of the Status field, such information can be identified and managed more precisely and effectively.

In the various embodiments of the present invention, the size of each field or each flag of the field can be varied according to the need. For instance, instead of having a 1-bit session flag (31a), it is possible to use two-bits session flag. Further, the manner in which the different values of the flags/fields are assigned to indicate different information (e.g., different SRR types, session start information, open/close information or padding information) can be selectively changed as needed. For instance, in FIG. 14, the padding flag values of "00b", "10b" and "11b" can be designated to indicate respectively a closed SRR without padding, a closed SRR with padding, and an opened SRR. Moreover the location of each flag within the Start field, or the location of each field in the SRR entry may be changed. For instance, the session flag can be any one of the first four bits of the Status field.

Figure 16:
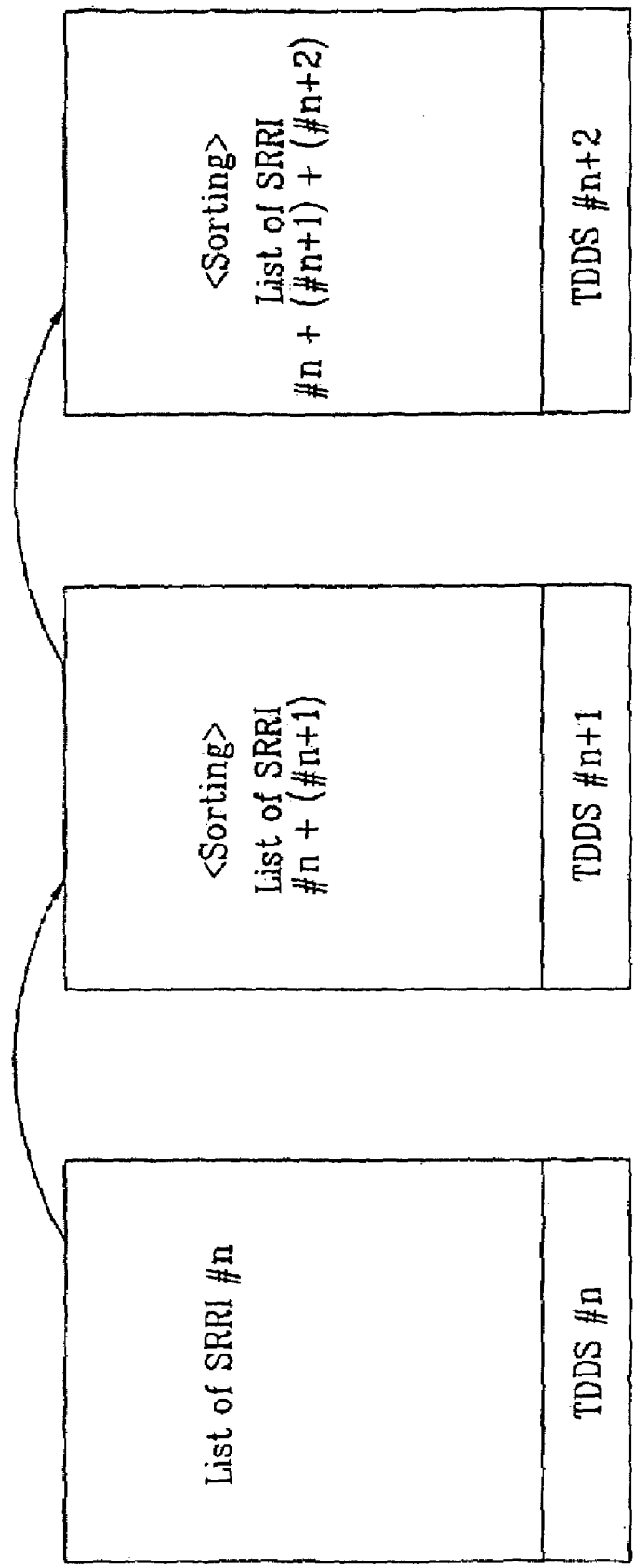
FIG. 16 illustrates a method of updating SRR information on a write-once optical disc according to the present invention.

FIG. 16 illustrates a method of updating the SRR information according to the present invention. It involves sorting SRR entries included in the SRRI in a specific order and recording the sorted SRRI accumulatively. The method of FIG. 16 can be applied to all the first to fifth embodiments of the present invention.

Referring to FIG. 16, the n-th recorded SRR information is verified to record the (n+1)-th updated SRR information. The n-th recorded SRR information and the (n+1)-th SRR information to be updated currently are collected together and sorted in a specific order. Then the sorted SRRI is recorded on the disc. In the same manner, the (n+1)-th recorded SRR information is verified to record the (n+2)-th updated SRR information. The (n+1)-th recorded SRR information, and the (n+2)-th SRR information to be updated currently are collected together and sorted in a specific order. The sorted SRRI information is recorded on the disc.

As an example, as for the sorting order, the SRR type information (status) identifying the SRR type of an SRR entry is the first criteria by which the sorting occurs. Then among the same SRR types, the start address of the SRRs is used as the second criteria to sort. However, as for the sorting order, how to determine the sorting criterion is a selection problem and various selections can be made according, to a system or a designer.

According to the present invention, all the SRRs existing in the write-once optical disc such as a BD-WO can be sorted according to the SRR type so that the SRR type information for the SRRs can be easily recognized. All the previous SRRI can be confirmed at once only with reference to the latest SRRI updated last, so that the access time can be saved.

Figure 17:
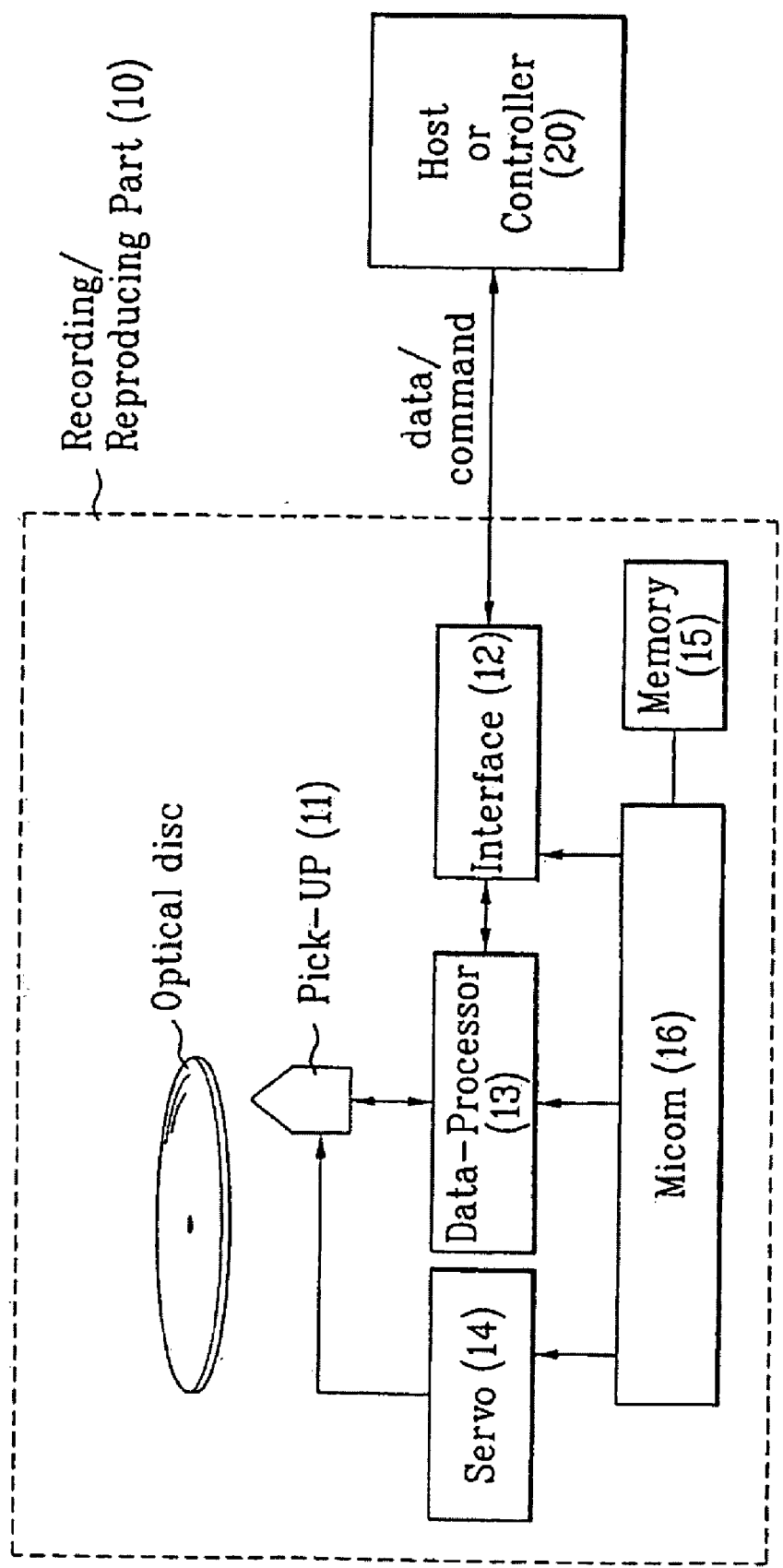
FIG. 17 illustrates an optical disc recording/reproducing apparatus according to the present invention.

FIG. 17 illustrates an optical disc recording/reproducing apparatus according to the present invention. This apparatus or other suitable apparatus or system can be used to implement the structure of the disc and the method of recording the disc management information including the recording status information, as discussed in the various embodiments of the present invention.

Referring to FIG. 17, the optical disc recording/reproducing apparatus includes a recording/reproducing unit 10 for recording and reproducing data to/from the optical disc and a controller 20 for controlling the recording/reproducing unit 10. All the elements of the recording/reproducing apparatus are operatively coupled. The controller 20 transmits a command for recording or reproducing to/from a special recording area such as an SRR/session on the disc, to the recording/reproducing unit 10. The recording/reproducing unit 10 records or reproduces data to/from the disc according to the commands of the controller 20. The recording/reproducing unit 10 includes an interface unit 12, a pick-up unit 11, a data processor 13, a servo unit 14, a memory 15 and a microcomputer 16. The interface unit 12 communicates with external devices such as the controller 20. The pick-up unit 11 records or reproduces data to/from the optical disc directly. The data processor 13 receives a reproduction signal from the pick-up unit 11, restores a preferred signal, modulates a signal proper to the optical disc, and transmits the signal. The servo unit 14 controls the pick-up unit 11 to read the signal from the optical disc or to record the signal to the optical disc. The memory 15 stores temporarily data and various information including management information as discussed above. The microcomputer 16 controls the components of the recording/reproducing unit 10. Since the recording/reproducing apparatus shown in FIG. 17 can selectively perform a padding operation, a designer can more freely design the recording/reproducing apparatus. The recording/reproducing unit 10 can automatically store specific data during a padding operation.

An optical disc recording/reproducing process will be described according to the present invention. When the optical disc such as a BD-WO is loaded in the recording/reproducing apparatus such as the apparatus of FIG. 17, SRR information is read as the recent disc management information recorded in a predetermined management area such as a TDMA in the disc. The SRR header and SRR entry recorded in the SRR information are read and are temporarily recorded in the memory 15 of the recording/reproducing unit 10. The recent disc recording status is represented in the stored SRR information. As discussed above, the disc recording status for the entire area of the disc, and, the existence and location of a specific session can be confirmed from the SRR type information and the LRA information in each SRR. As a result, the use of the SRRI as defined according to the present invention is advantageous and effective.

For instance, since the microcomputer 16 can confirm exactly the SRR type existing, in the disc from the SRR information, the recordable NWA can be identified from the confirmed opened SRR. From the confirmed closed SRR, it can be confirmed whether or not the SRR is padded. If the SRR is closed without padding, the corresponding area may be padded, so that the unrecorded area can be cleared.

When the SRR is closed according to the close command of the controller 20, the microcomputer 16 can determine whether the SRR is closed after padding or without padding. According to the designer, the apparatus can be designed to close the SRR after padding unconditionally even without any padding command from the controller 20.

When the SRR type is changed due to padding as described above, the SRR type information in the SRR entry is changed and recorded, so that another recording/reproducing apparatus can use such information.

The function described above can be called "automatic padding function" of the recording/reproducing unit 10. The use of this function in the recording/reproducing unit 10 may be more advantageous in time over receiving the dummy data in response to a padding command of the controller 20 and padding the SRR.

Accordingly, the definitions of the SRR type and the method of recording the SRR information according to the set definitions can be variably selected.

The write-once optical disc management information recording method according to the present invention includes defining new SRR types and session types representing disc recording status more precisely, and recording identification information for identifying an SRR type and a session in the SRR information, so that the management information can be efficiently recorded and managed.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for recording management information on a recording medium, the method comprising:
    determining whether recording of padding data in a recordable area of a recordable recording-range of the recording medium is performed, when the recordable recording-range is changed to be a non-recordable recording range; and
    recording padding indicator information indicating whether the recording of padding data is performed,
    wherein the value of the padding indicator information is determined based on the determining step.

2. The method of claim 1, wherein the recording of padding data is selectively performed.

3. The method of claim 1, wherein the padding data is dummy data or zero values.

4. The method of claim 1, wherein the padding data is recorded in all recordable area of the recordable recording-range.

5. The method of claim 1, wherein the padding indicator information is recorded on a management area of the recording medium.

6. The method of claim 1, wherein the padding indicator information consists of 2 bits.

7. An apparatus for recording management information on a recording medium, the apparatus comprising:
    a recording/reproducing part configured to write/read data on/from the recording medium; and
    a controller, operatively coupled to the recording/reproducing part, configured to determine whether recording of padding data in a recordable area of a recordable recording-range of the recording medium is performed when the recordable recording-range is changed to be a non-recordable recording range, the controller further configured to control the recording/reproducing part to record padding indicator information indicating whether the recording of padding data is performed,
    wherein the value of the padding indicator information is determined based on the determining of whether recording of padding data in a recordable area of a recordable recording-range of the recording medium is performed.

8. The apparatus of claim 7, wherein the controller is configured to control the recording/reproducing part to selectively record the padding data.

9. The apparatus of claim 7, wherein the controller is configured to control the recording/reproducing part to record the padding data as dummy data or zero values.

10. The apparatus of claim 7, wherein the controller is configured to control the recording/reproducing part to record the padding data in all recordable area of the recordable recording-range.

11. The apparatus of claim 7, wherein the controller is configured to control the recording/reproducing part to record the padding indicator information on a management area of the recording medium.

12. The apparatus of claim 7, wherein the controller is configured to control the recording/reproducing part to record the padding indicator information consisting of 2 bits.

13. A method for recording management information on a recording medium, the method comprising:
    recording padding data in a recordable area of a recordable recording-range of the recording medium, when the recordable recording-range is changed to be a non-recordable recording range; and
    recording padding indicator information indicating whether the recording of padding data is performed,
    wherein the recording of padding data is automatically performed without an external command, when the recordable recording-range is changed to be a non-recordable recording range.

14. The method of claim 13, wherein the padding data is dummy data or zero values.

15. The method of claim 13, wherein the padding indicator information consists of 2 bits.

16. An apparatus for recording management information on a recording medium, the apparatus comprising:
    a pick-up unit configured to write/read data on/from the recording medium; and
    a controller, operatively coupled to the pick-up unit, configured to control the pick-up unit to record padding data in a recordable area of a recordable recording-range of the recording medium when the recordable recording-range is changed to be a non-recordable recording range, the controller further configured to control the pick-up unit to record padding indicator information indicating whether the recording of padding data is performed,
    wherein the controller is configured to control the pick-up unit to automatically record the padding data without an external command, when the recordable recording-range is changed to be a non-recordable recording range.

17. The apparatus of claim 16, wherein the controller is configured to control the pick-up unit to record the padding data as dummy data or zero values.

18. The apparatus of claim 16, wherein the controller is configured to control the pick-up unit to record the padding indicator information consisting of 2 bits.

19. A computer-readable medium, comprising:
- a first area configured to be allocated a recordable recording-range having at least one recordable recording unit, wherein when the recordable recording-range is changed to be a non-recordable recording range, the at least one recordable recording unit is padded with padding data; and
- a second area configured to be recorded with padding indicator information indicating whether the padding data is padded in the at least one recordable recording unit, wherein the at least one recordable recording unit is selectively padded with the padding data according to an command and the value of the padding indicator information is determined based on the selective recording of the padding data.

20. The computer-readable medium of claim 19, wherein the padding data is dummy data or zero values.

21. The computer-readable medium of claim 19, wherein the first area is a data area and the second area is a management area, the data area and the management area being separately allocated respectively.

22. The computer-readable medium of claim 19, wherein the padding indicator information consists of 2 bits.

* * * * *